United States Patent
Kitani et al.

(10) Patent No.: US 8,332,950 B2
(45) Date of Patent: Dec. 11, 2012

(54) DISC MANUFACTURING METHOD, DATA RECORDING APPARATUS, INFORMATION RECORDING MEDIUM, INFORMATION PROCESSING APPARATUS AND METHOD, AND COMPUTER PROGRAM

(75) Inventors: Satoshi Kitani, Tokyo (JP); Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1103 days.

(21) Appl. No.: 11/817,401

(22) PCT Filed: Mar. 1, 2006

(86) PCT No.: PCT/JP2006/303843
§ 371 (c)(1),
(2), (4) Date: Aug. 29, 2007

(87) PCT Pub. No.: WO2006/098151
PCT Pub. Date: Sep. 21, 2006

(65) Prior Publication Data
US 2009/0238362 A1 Sep. 24, 2009

(30) Foreign Application Priority Data
Mar. 15, 2005 (JP) .............................. P2005-072351

(51) Int. Cl.
*G06F 21/00* (2006.01)

(52) U.S. Cl. ............... 726/26; 726/27; 726/28; 726/29; 726/30; 726/32; 713/156; 713/176; 713/181; 713/189; 713/193; 380/200; 380/201; 380/203; 380/229; 380/239; 380/241; 369/47.1; 369/47.14; 369/53.11; 369/59.23

(58) Field of Classification Search .......... 713/155–158, 713/164–167, 173, 176–181, 189–193; 380/200–203, 227–230, 239–242; 369/13.26, 369/30.03, 272.1, 53.21–53.24, 47.1–47.14, 369/53.12–53.14, 59.23–59.25; 726/22–30
See application file for complete search history.

(56) References Cited

U.S. PATENT DOCUMENTS
5,805,551 A * 9/1998 Oshima et al. .................. 705/57
(Continued)

FOREIGN PATENT DOCUMENTS
JP 2003-196836 7/2003
(Continued)

OTHER PUBLICATIONS
Handbook of Applied Cryptography by Menezes et al; Year: 1996; Publisher: CRC Press.*
Direct laser marking on ROM media for identification by Nakahara et al; Year: 2003; Publisher: SPIE.*

*Primary Examiner* — Taghi Arani
*Assistant Examiner* — Madhuri Herzog
(74) *Attorney, Agent, or Firm* — K&L Gates LLP

(57) ABSTRACT

A product mark including a public key certificate issued with respect to an information-recording-medium manufacturing entity or information-recording-medium manufacturing equipment, and an encrypted volume ID calculated by computation based on a product-mark-associated value such as a hash value generated on the basis of the product mark, and a volume ID as an identifier set with respect to a given set of discs to be manufactured, are generated. The product mark and the encrypted volume ID are set as information for generating a key used for decryption of encrypted content, and recorded onto a disc by a reflective-film-removal recording method. Due to this configuration, the product mark and the encrypted volume ID as key generating information cannot be read from a pirated disc produced by physically copying a pit pattern on the basis of a legitimate commercial disc, thereby making it possible to prevent unauthorized reproduction or use of content.

16 Claims, 23 Drawing Sheets

U.S. PATENT DOCUMENTS

| | | | |
|---|---|---|---|
| 6,401,206 B1 * | 6/2002 | Khan et al. | 713/176 |
| 6,728,882 B2 * | 4/2004 | Gotoh et al. | 713/193 |
| RE39,297 E * | 9/2006 | Oshima et al. | 369/272.1 |
| 2001/0013023 A1 * | 8/2001 | Oshima et al. | 705/57 |
| 2002/0067674 A1 * | 6/2002 | Schneck et al. | 369/53.22 |
| 2002/0141583 A1 * | 10/2002 | Barnard et al. | 380/202 |
| 2002/0152387 A1 * | 10/2002 | Asano | 713/176 |
| 2002/0159594 A1 * | 10/2002 | Kori | 380/203 |

FOREIGN PATENT DOCUMENTS

| | | |
|---|---|---|
| JP | 2006-085813 | 3/2006 |
| JP | 2006-134385 | 5/2006 |
| WO | 96/16401 | 5/1996 |

* cited by examiner

DISC MANUFACTURING METHOD, DATA RECORDING APPARATUS, INFORMATION RECORDING MEDIUM, INFORMATION PROCESSING APPARATUS AND METHOD, AND COMPUTER PROGRAM

CROSS REFERENCE TO RELATED APPLICATIONS

The present application claims priority to Japanese Patent Document No. 2005-072351 filed on Mar. 15, 2005, the disclosure of which is herein incorporated by reference.

BACKGROUND

The present invention relates to a disc manufacturing method, a data recording apparatus, an information recording medium, an information processing apparatus and method, and a computer program. More specifically, the present invention relates to a disc manufacturing method, a data recording apparatus, an information recording medium, an information processing apparatus and method, and a computer program, which make it possible to prevent unauthorized use of content in the form of pirated discs and to track down the original manufacturer of pirated discs.

In recent years, information recording media that can store large volumes of data, such as a DVD (Digital Versatile Disc) and a BD [Blu-ray Disc (trademark)], are becoming increasingly commonplace. Digital data such as high-definition image data is recorded onto these large-capacity discs.

Since digital data can be repeatedly recorded and reproduced without degradation of image or sound quality, distribution of unauthorized copies of content via the Internet, and circulation of pirated discs produced by copying content onto recording media such as a CD-R and a DVD have become a major problem.

In particular, a problem that has arisen recently is the practice in which proper DVD manufacturing equipment is set up, a stamper is prepared on the basis of a legitimate commercial DVD disc, and a large quantity of pirated discs are mass-produced on the basis of the stamper and circulated. Further, with regard to legitimate licensed disc plants as well, the problem of illicit manufacture and sales of discs has arisen, in which more discs than approved by a license are illicitly produced, and surplus discs are sold without consent. Circulation of such illicitly produced discs constitutes an infringement on the copyright of content, and some preventive measures are required.

A manufacturing process for a disc such as a DVD or BD will be described with reference to FIG. 1. FIG. 1 is a diagram illustrating the manufacturing process of an information recording medium storing content whose usage is permitted on the basis of a legitimate content usage right, for example, ROM discs such as a DVD or a BD disc. As shown in FIG. 1, content is delivered from a content owner 11 who owns the content to a content authoring entity 12 which performs content authoring and undergoes authoring, thereby generating authored content for disc recording. Thereafter, a disc 50 to be circulated into the market is produced at a disc manufacturing plant 20.

The content owner 11 delivers, together with the content, usage control information (Usage Rule) that sets forth the usage right for the content, to the content authoring entity 12. The usage control information (Usage Rule) is set in correspondence with the content, for example, and includes information as to whether or not copying of the content is allowed. The usage control information is also stored together with the content onto a disc 30 that is finally delivered to the user. When using the content with a user device such as a reproducing apparatus, a content usage application executed on the user device refers to the usage control information, and executes the use of the content in compliance with the usage control information.

The disc manufacturing plant 20 receives the authored content from the content authoring entity 12 and the usage control information (Usage Rule), and further receives key information to be applied to content encryption and decryption from a licensing entity 13 that performs content usage management. The licensing entity 13 carries out content usage management, and generates various kinds of key data such as MKB (Media Key Block) and media key (Km) and provides these pieces of data to the disc manufacturing plant 20.

An MKB (Media Key Block) is an encryption key block generated on the basis of a tree-structure key distribution scheme known as one type of a broadcast encryption scheme. The MKB is a key information block allowing the acquisition of a media key (Km), which is a key necessary for decryption of content, only by processing (decryption) based on a device key (Kd) stored in an information processing apparatus of a user having a valid license. The MKB represents an application of an information distribution scheme according to a so-called hierarchical tree structure. The acquisition of the media key (Km) is allowed only when the user device (information processing apparatus) has a valid license, and the media key [Km] cannot be acquired by a revoked user device.

The licensing entity 13 can generate an MKB configured so that, through a change of the device key used for encryption of key information stored in the MKB, decryption, that is, acquisition of a media key required for content decryption, cannot be performed with a device key stored in a specific user device. Accordingly, it is possible to provide encrypted content that can be decrypted only with respect to a device with a valid license by revoking an unauthorized device at arbitrary timing.

In the disc manufacturing plant 20, a formatter 31 executes such processing as content encryption and formatting of each piece of data. Further, after executing the preparation of a master or stamper by a cutting machine 32, the disc 50 is manufactured by a replicator 33 by using the prepared stamper. The disc manufacturing plant 20 manufactures the number of discs 50 permitted by the licensing entity 13.

Content encryption and generation of disc-stored data executed by the formatter 31 will be described with reference to FIG. 2. FIG. 2 shows processing at the disc manufacturing plant 20, and processing by an information processing apparatus (reproducing apparatus) 60 as a user device that uses data stored in the information recording medium (disc) 50 and content stored in the information recording medium (disc) 50.

It should be noted that in FIG. 2, processing by the cutting machine 32 and the replicator 33 shown in FIG. 1 is omitted. Basically, data generated by the formatter 31 is stored onto the information recording medium (disc) 50. Now, processing at the disc manufacturing plant 20 shown in FIG. 2 will be described.

As described above, the MKB 21 is an encryption key block received from the licensing entity 13, and allows a media key (Km) to be extracted by processing with a device key (Kd) 61 stored in a memory of the user device with a legitimate license, that is, the information processing apparatus (reproducing apparatus) 60 shown in FIG. 2.

The MKB 21 is stored in the information recording medium (disc) 50. This corresponds to an MKB 51 in the drawing. A volume ID 22 is an identifier (ID) set for a predetermined number of discs as a unit, and is generated by a random-number generation process or the like at the disc plant 20. The volume ID 22 is recorded with respect to the information recording medium (disc) 50. This corresponds to a volume ID 52 in the drawing. The volume ID 52 is recorded in a format different from the data recording format that can be realized by a standard recording apparatus as a user device. That is, data writing employing special signal processing is performed. Special signal processing is also required for data recording. For example, the ROM-mark scheme (side-channel scheme) or the like is employed.

Further, at the disc manufacturing plant 20, in step S11, a media key (Km) 23 received from the licensing entity 13, and the volume ID 22 are concatenated, and a hash value is calculated in step S12, thus generating a volume-unique key (Kuv). Further, in step S13, the hash value of usage control information (Usage Rule) 25 corresponding to disc-stored content is calculated, and in step S14, an exclusive-OR of a title key (Title Key) 24 set in correspondence with the content and generated through random-number generation or the like at the disc plant 20, and the hash value of the usage control information is calculated. The result of this exclusive-OR operation is encrypted with the volume-unique key (Kuv) generated on the basis of the volume ID 22 and the media key (Km), and is stored onto the information recording medium 50. This corresponds to an encrypted key (Encrypted Key) 53 in the drawing. The encrypted key (Encrypted Key) is encrypted data obtained based on the title key 24 and the hash value of the usage control information 25.

Further, the usage control information 25 is also stored onto the information recording medium 50. This corresponds to usage control information 54 shown in the drawing. Content 26 is authored content generated by the content authoring entity 12 described above with reference to FIG. 1. Encryption of the content 26 is executed with the title key 24 in step S16, and the content 26 is stored onto the information recording medium 50 as encrypted content 55.

As a result, as shown in the drawing, the information recording medium (disc) 50 stores the MKB 51 as the encryption key block storing the media key [Km], the volume ID 52 written by special signal processing, the encrypted key 53, the usage control information (Usage Rule) 54, and the encrypted content 55.

The information recording medium 50 is loaded into the information processing apparatus (reproducing apparatus) 60 as a user device. By executing a predetermined data reproducing application, a preset processing sequence is executed to thereby perform reproduction of content.

First, in step S21, the information processing apparatus (reproducing apparatus) 60 executes the processing of the MKB 51 read from the information recording medium 50, by using the device key (Kd) stored in the memory of the information processing apparatus (reproducing apparatus) 60. It should be noted that to acquire the media key (Km) from the MKB 51, it is necessary to use a device key (Kd) that is stored in an information processing apparatus having a valid license. A user device that has been revoked cannot acquire the media key (Km).

Next, in step S22, the media key (Km) acquired from the MKB and the volume ID read from the information recording medium 50 are concatenated, and in step S23, the hash value is calculated, thereby generating a volume-unique key (Kuv).

Next, in step S24, decryption of the encrypted key (Encrypted Key) 53 read from the information recording medium 50 is executed with the volume-unique key (Kuv) thus generated. Further, in step S25, the hash value of the usage control information 54 read from the information recording medium 50 is calculated. In step S26, an exclusive-OR operation between this hash value and the decrypted result of step S24 is executed.

The processing of steps S24 to S26 corresponds to a process reverse to the steps S13 to S16 executed at the disc manufacturing plant 20. A title key is calculated through the processing of steps S24 to S26. In step S27, using the title key thus generated, decryption of the encrypted content 55 read from the information recording medium 50 is executed, and content 62 is outputted.

As described above, various kinds of data are stored in the information recording medium 50 so as to allow usage of content only by a user device having a legitimate license. At the disc manufacturing plant 20, necessary data is received from the licensing entity 13 and the content authoring entity 12, and processing according to a predetermined process is executed to manufacture the information recording medium 50. On the other hand, on the side of the information processing apparatus 60 as a user device as well, processing according to a predetermined sequence is performed, thereby enabling decryption and reproduction of content.

However, as described above, pirated discs are manufactured through various processes and circulated. Referring to FIGS. 3 to 6, description will be given of a plurality of ways in which pirated discs are manufactured.

There are the following ways to manufacture pirated discs.
(1) Production of pirated discs through production of more discs than permitted by a license
(2) Production of pirated discs by using a diverted stamper
(3) Production of pirated discs on the basis of copying of a read signal (RF signal) from a legitimate commercial disc
(4) Production of pirated discs by physically copying a pit pattern from a legitimate commercial disc These processes will be described below.

FIG. 3 is a diagram illustrating the process (1) production of pirated discs through production of more discs than permitted by a license. The disc manufacturing plant 20 is a plant that possesses a legitimate license and for which production of the disc 50 is permitted on the basis of the legitimate license. However, according to this process, pirated discs 70 are produced by producing more discs than permitted by the license, and are sold through illicit channels.

FIG. 4 is a diagram illustrating the process (2) production of pirated discs by using a diverted stamper. The disc manufacturing plant 20 is a plant that possesses a legitimate license and for which production of the disc 50 is permitted on the basis of the legitimate license. However, according to this process, the stamper manufactured with the cutting machine 32, that is, the stamper in which formatted data is recorded is diverted to a pirated-disc manufacturing plant 80, and the pirated discs 70 are produced using a replicator 81 installed in the pirated-disc manufacturing plant 80.

FIG. 5 is a diagram illustrating the process (3) production of pirated discs on the basis of copying of a read signal (RF signal) from a legitimate commercial disc. According to this process, unlike in the processes (1) and (2), the pirated discs 70 are produced using the legitimate commercial disc 50.

A pirated-disc manufacturing plant 90 loads the legitimate commercial disc 50 into a reader 91, and performs reading of an RF signal from the legitimate disc 50. An RF signal is a signal obtained by conversion from a read optical signal from the disc 50 that has not been converted into a reproduction signal. This RF signal is inputted to a cutting machine 92 for preparing a master or stamper to manufacture a stamper, and a large number of pirated discs 70 are produced using a replicator 93.

FIG. 6 is a diagram illustrating the process (4) production of pirated discs by physically copying a pit pattern from a legitimate commercial disc. As in the process (3), in this process as well, the pirated discs 70 are produced using the legitimate commercial disc 50.

According to this process, a pirated-disc manufacturing plant 95 loads the legitimate commercial disc 50 into a disc separating device 96, and separates the protective film and the reflective film on the surface of the disc 50. The pit pattern on the disc becomes fully exposed by this process. Then, the pit pattern is physically copied by a transfer device 97, thereby forming a stamper. Thereafter, a large number of pirated discs 70 are produced with this stamper by using a replicator 98.

As described above, there are various techniques for manufacturing pirated discs. Effective measures for preventing the use of such techniques are being desired.

SUMMARY

The present invention has been made in view of the above-mentioned problems. Accordingly, it is an object of the present invention to provide a disc manufacturing method, a data recording apparatus, an information recording medium, an information processing apparatus and method, and a computer program, which make it possible to prevent unauthorized use of content in the form of pirated discs, and to identify equipment involved in the manufacture of the pirated discs.

According to a first aspect of the present invention, there is provided a disc manufacturing method for manufacturing a disc storing encrypted content, including: a product-mark generating step of generating a product mark as information for generating a key applied to decryption of the encrypted content, the product mark including a public key certificate corresponding to a disc manufacturing entity or disc manufacturing equipment and containing identification information for a disc manufacturing entity or disc manufacturing equipment; an encrypted-volume-ID generating step of generating an encrypted volume ID as information for generating a key applied to decryption of the encrypted content, the encrypted volume ID being data obtained by performing encryption on a result of computation based on a product-mark-associated value generated on the basis of the product mark, and a volume ID as an identifier set with respect to a given set of discs to be manufactured; and an individual data recording step of recording the product mark and the encrypted volume ID onto each individual disc, at least one of the product mark and the encrypted volume ID being recorded by a reflective-film-removal recording method.

Further, in the disc manufacturing method according to an embodiment of the present invention, the product-mark generating step is a step of generating a product mark including, in addition to the public key certificate, a serial number set for each disc to be manufactured, and digital signature data set in correspondence to the serial number, and the encrypted-volume-ID generating step is a step of generating an encrypted volume ID on the basis of the volume ID and a product-mark-associated value generated on the basis of a product mark including the public key certificate, a serial number, and digital signature data set in correspondence to the serial number.

Further, in the disc manufacturing method according to an embodiment of the present invention, the product-mark generating step is a step of generating a product mark including, in addition to the public key certificate, date-of-manufacturer information for a disc to be manufactured, and digital signature data set in correspondence to the date-of-manufacturer information, and the encrypted-volume-ID generating step is a step of generating an encrypted volume ID on the basis of the volume ID and a product-mark-associated value generated on the basis of a product mark including the public key certificate, date-of-manufacturer information, and digital signature data set in correspondence to the date-of-manufacturer information.

Further, in the disc manufacturing method according to an embodiment of the present invention, the encrypted-volume-ID generating step is a step of generating an encrypted volume ID on the basis of the volume ID and a product-mark-associated value generated as a hash value based on the product mark.

Further, in the disc manufacturing method according to an embodiment of the present invention, the encrypted-volume-ID generating step is a step of generating an encrypted volume ID by applying an encryption process on a value calculated by computation based on the product-mark-associated value and the volume ID, the encryption process using a master key set with respect to a given set of discs to be manufactured or using a hash value of the master key.

Further, in the disc manufacturing method according to an embodiment of the present invention, the disc manufacturing method further includes a step of recording the master key by applying a modulation process different from a recording mode of encrypted content recorded onto a disc.

Further, in the disc manufacturing method according to an embodiment of the present invention, the product mark and the encrypted volume ID are generated and recorded for each individual disc to be manufactured in the individual data recording step, without being set as information to be recorded onto a master or a stamper applied to disc manufacture.

Further, according to a second aspect of the present invention, there is provided a data recording apparatus which executes data recording with respect to an information recording medium, including: a product-mark generating section that generates a product mark as information for generating a key applied to decryption of encrypted content recorded on the information recording medium, the product mark including a public key certificate corresponding to an information-recording-medium manufacturing entity or information-recording-medium manufacturing equipment and containing identification information for an information-recording-medium manufacturing entity or information-recording-medium manufacturing equipment; an encrypted-volume-ID generating section that generates an encrypted volume ID as information for generating a key applied to decryption of encrypted content recorded on the information recording medium, the encrypted volume ID being data obtained by performing encryption on a result of computation based on a product-mark-associated value generated on the basis of the product mark, and a volume ID as an identifier set with respect to a given set of information recording media to be manufactured; and a data recording section that records the product mark and the encrypted volume ID onto each individual information recording medium, at least one of the product mark and the encrypted volume ID being recorded by a reflective-film-removal recording method.

Further, in the data recording apparatus according to an embodiment of the present invention, the product-mark generating section is configured to generate a product mark including, in addition to the public key certificate, a serial number set for each information recording medium to be manufactured, and digital signature data set in correspondence to the serial number, and the encrypted-volume-ID generating section is configured to generate an encrypted volume ID on the basis of the volume ID and a product-mark-associated value generated on the basis of a product mark including the public key certificate, a serial number, and digital signature data set in correspondence to the serial number.

Further, in the data recording apparatus according to an embodiment of the present invention, the product-mark generating section is configured to generate a product mark including, in addition to the public key certificate, date-of-manufacturer information for an information recording medium to be manufactured, and digital signature data set in correspondence to the date-of-manufacturer information, and the encrypted-volume-ID generating section is configured to generate an encrypted volume ID on the basis of the volume ID and a product-mark-associated value generated on the basis of a product mark including the public key certificate, date-of-manufacturer information, and digital signature data set in correspondence to the date-of-manufacturer information.

Further, according to a third aspect of the present invention, there is provided an information recording medium including encrypted content recorded therein, the information recording medium storing: a product mark which is data including a public key certificate corresponding to an information-recording-medium manufacturing entity or information-recording-medium manufacturing equipment and containing identification information for an information-recording-medium manufacturing entity or information-recording-medium manufacturing equipment, the product mark serving as information for generating a key applied to decryption of the encrypted content; and an encrypted volume ID which is information for generating a key applied to decryption of encrypted content recorded on the information recording medium, and is data obtained by performing encryption on a result of computation based on a product-mark-associated value generated on the basis of the product mark, and a volume ID as an identifier set with respect to a given set of information recording media to be manufactured, the encrypted volume ID serving as information for generating a key applied to decryption of the encrypted content, in which at least one of the product mark and the encrypted volume ID is recorded by a reflective-film-removal recording method.

Further, in the information recording medium according to an embodiment of the present invention, in addition to the public key certificate, the product mark includes a serial number set for each information recording medium to be manufactured, and digital signature data set in correspondence to the serial number.

Further, in the information recording medium according to an embodiment of the present invention, in addition to the public key certificate, the product mark includes date-of-manufacturer information for an information recording medium to be manufactured, and digital signature data set in correspondence to the date-of-manufacturer information.

Further, according to a fourth aspect of the present invention, there is provided an information processing apparatus which executes data reading and content reproduction from an information recording medium recording encrypted content, including: a data acquiring section that executes reading of data from an information recording medium; a key generating section that generates a key used for content decryption by executing data processing based on data acquired by the data acquiring section; and a decryption processing section that executes decryption of encrypted content on the basis of a key generated by the key generating section. The key generating section is configured to receive an input of key generating information from the data acquiring section, and generates a key used for content decryption by executing data processing to which the key generating information is applied, the key generating information including: a product mark including a public key certificate corresponding to an information-recording-medium manufacturing entity or information-recording-medium manufacturing equipment and containing identification information for an information-recording-medium manufacturing entity or information-recording-medium manufacturing equipment; and an encrypted volume ID as data obtained by performing encryption on a result of computation based on a product-mark-associated value generated on the basis of the product mark, and a volume ID as an identifier set with respect to a given set of information recording media.

Further, according to a fifth aspect of the present invention, there is provided an information processing method for executing data reading and content reproduction from an information recording medium recording encrypted content, including: a data acquiring step of executing reading of data from an information recording medium; a key generating step of generating a key used for content decryption by executing data processing based on data acquired by the data acquiring section; and a decryption processing step of executing decryption of encrypted content on the basis of a key generated by the key generating section. The key generating step is a step of inputting key generating information, and generating a key used for content decryption by executing data processing to which the key generating information is applied, the key generating information including: a product mark including a public key certificate corresponding to an information-recording-medium manufacturing entity or information-recording-medium manufacturing equipment and containing identification information for an information-recording-medium manufacturing entity or information-recording-medium manufacturing equipment; and an encrypted volume ID as data obtained by performing encryption on a result of computation based on a product-mark-associated value generated on the basis of the product mark, and a volume ID as an identifier set with respect to a given set of information recording media.

Further, according to a sixth aspect of the present invention, there is provided a computer program for causing data recording with respect to an information recording medium to be executed on a computer, including: a product-mark generating step of generating a product mark as information for generating a key applied to decryption of encrypted content recorded on the information recording medium, the product mark including a public key certificate corresponding to an information-recording-medium manufacturing entity or information-recording-medium manufacturing equipment and containing identification information for an information-recording-medium manufacturing entity or information-recording-medium manufacturing equipment; an encrypted-volume-ID generating step of generating an encrypted volume ID as information for generating a key applied to decryption of encrypted content recorded on the information recording medium, the encrypted volume ID being data obtained by performing encryption on a result of computation based on a product-mark-associated value generated on the basis of the product mark, and a volume ID as an identifier set with respect to a given set of information recording media to be manufactured; and a data recording step of recording the product mark and the encrypted volume ID onto each individual information recording medium, at least one of the product mark and the encrypted volume ID being recorded by a reflective-film-removal recording method.

Further, according to a seventh aspect of the present invention, there is provided a computer program for causing data reading and content reproduction from a disc recording encrypted content to be executed on a computer, including: a data acquiring step of executing reading of data from an information recording medium; a key generating step of generating a key used for content decryption by executing data processing based on data acquired by the data acquiring section; and a decryption processing step of executing decryption of encrypted content on the basis of a key generated by the key generating section. The key generating step is a step of inputting key generating information, and generating a key used for content decryption by executing data processing to which the key generating information is applied, the key generating information including: a product mark including a public key certificate corresponding to an information-recording-medium manufacturing entity or information-recording-medium manufacturing equipment and containing identification information for an information-recording-medium manufacturing entity or information-recording-medium manufacturing equipment; and an encrypted volume ID as data obtained by performing encryption on a result of computation based on a product-mark-associated value generated on the basis of the product mark, and a volume ID as an identifier set with respect to a given set of information recording media.

It should be noted that the computer program according to the present invention can be provided to a computer system that can execute various program codes by a recording medium or communication medium provided in a computer-readable format, such as a CD, FD, or MO, or a communication medium such as a network. By providing such a program in a computer-readable format, processing corresponding to the program is realized on the computer system.

Further objects, features, and advantages of the present invention will become apparent from the following detailed description based on embodiments of the present invention that will be described later and the attached drawings. It should be noted that the term system as used in this specification refers to a logical assembly of a plurality of devices, without regard to whether or not the respective devices are accommodated in the same housing.

In the configuration according to the present invention, a product mark containing a public key certificate issued with respect to a disc manufacturing entity or disc manufacturing equipment, and an encrypted volume ID calculated by a computation based on a product-mark-associated value, such as a hash value generated on the basis of the product mark, and a volume ID as an identifier set with respect to a given set of discs to be manufactured, are generated. The product mark and the encrypted volume ID thus generated are recorded onto each disc as key generating information for generating a key used for decryption of encrypted content stored on the disc. Further, at least one of the product mark and the encrypted volume ID is recorded by the reflective film removing method. Therefore, the product mark or the encrypted volume ID as key generating information cannot be read from a pirated disc produced on the basis of a legitimate commercial disc by physically copying a pit pattern, thereby making it possible to prevent unauthorized reproduction or use of content.

Further, in the configuration according to the present invention, the public key certificate including identification information for an information-recording-medium manufacturing entity or information-recording-medium manufacturing equipment is included in the product mark. Therefore, with regard to a pirated disc generated by means other than physical copying of a pit pattern, for example on the basis of RF signal read data, an information-recording-medium manufacturing entity or information-recording-medium manufacturing equipment involved in the manufacture of the pirated disc can be tracked down and identified by acquiring a public key certificate from the disc.

Additional features and advantages of the present invention are described in, and will be apparent from, the following Detailed Description and the Figures.

DETAILED DESCRIPTION

Hereinbelow, a disc manufacturing method, a data recording apparatus, an information recording medium, an information processing apparatus and method, and a computer program according to the present invention will be described in detail with reference to the drawings. The description will be given in the following order of topics below.

1. Overview of Disc Manufacturing Process
2. Details of Disc Manufacturing Process
   (2.1) Processing Example 1 of Formatter
   (2.2) Processing Example 2 of Formatter
   (2.3) Processing Example 1 of ID Writer
   (2.4) Processing Example 2 of ID Writer
   (2.5) Processing Example 3 of ID Writer
3. Details of Generation and Reproduction Process for Disc-Recording Data
4. Disc Verification Process
5. Configuration of Information Processing Apparatus

[1. Overview of Disc Manufacturing Process]

Figure 1:
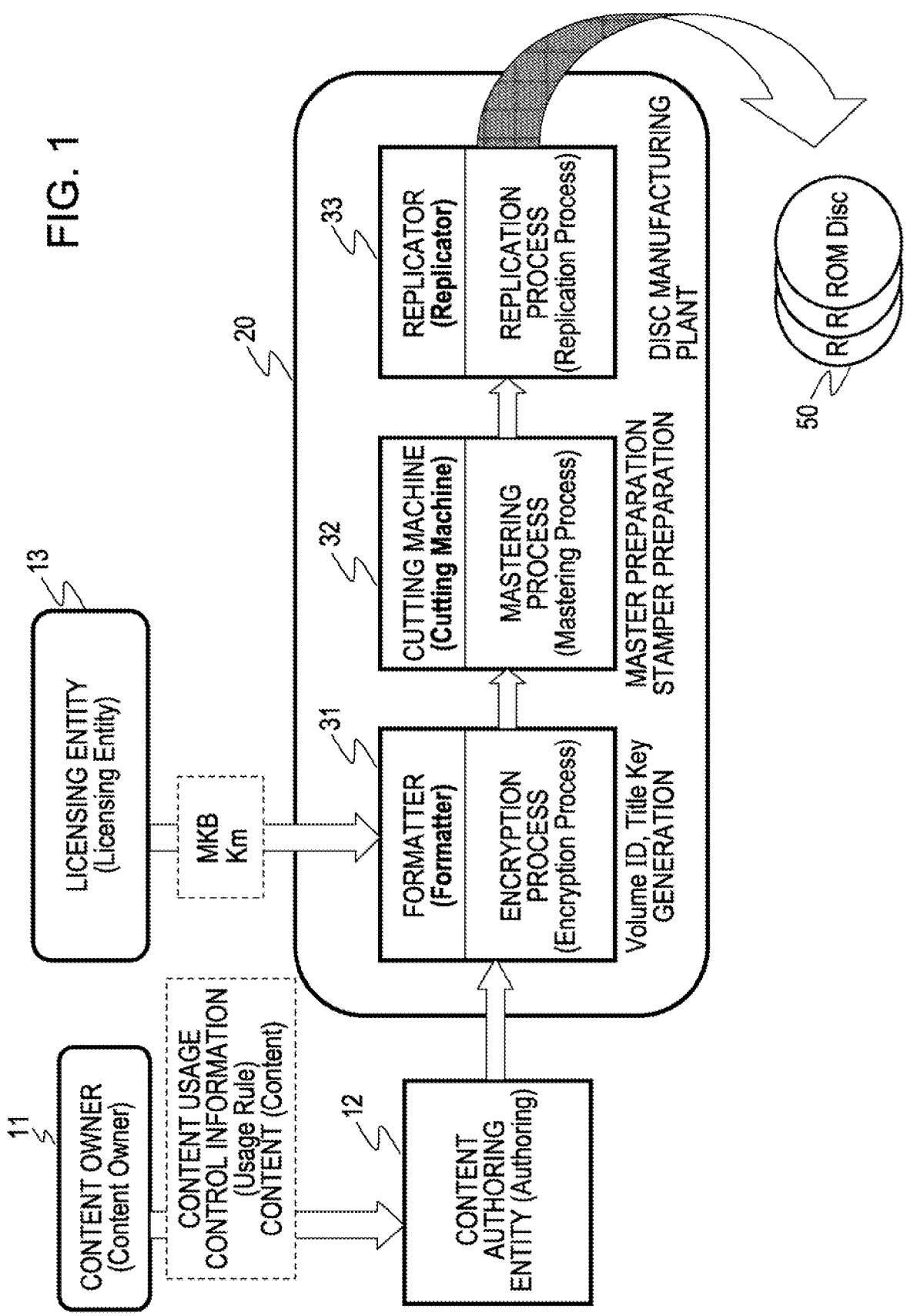
FIG. 1 is a diagram illustrating an overview of a disc manufacturing process according to the related art.
Figure 2:
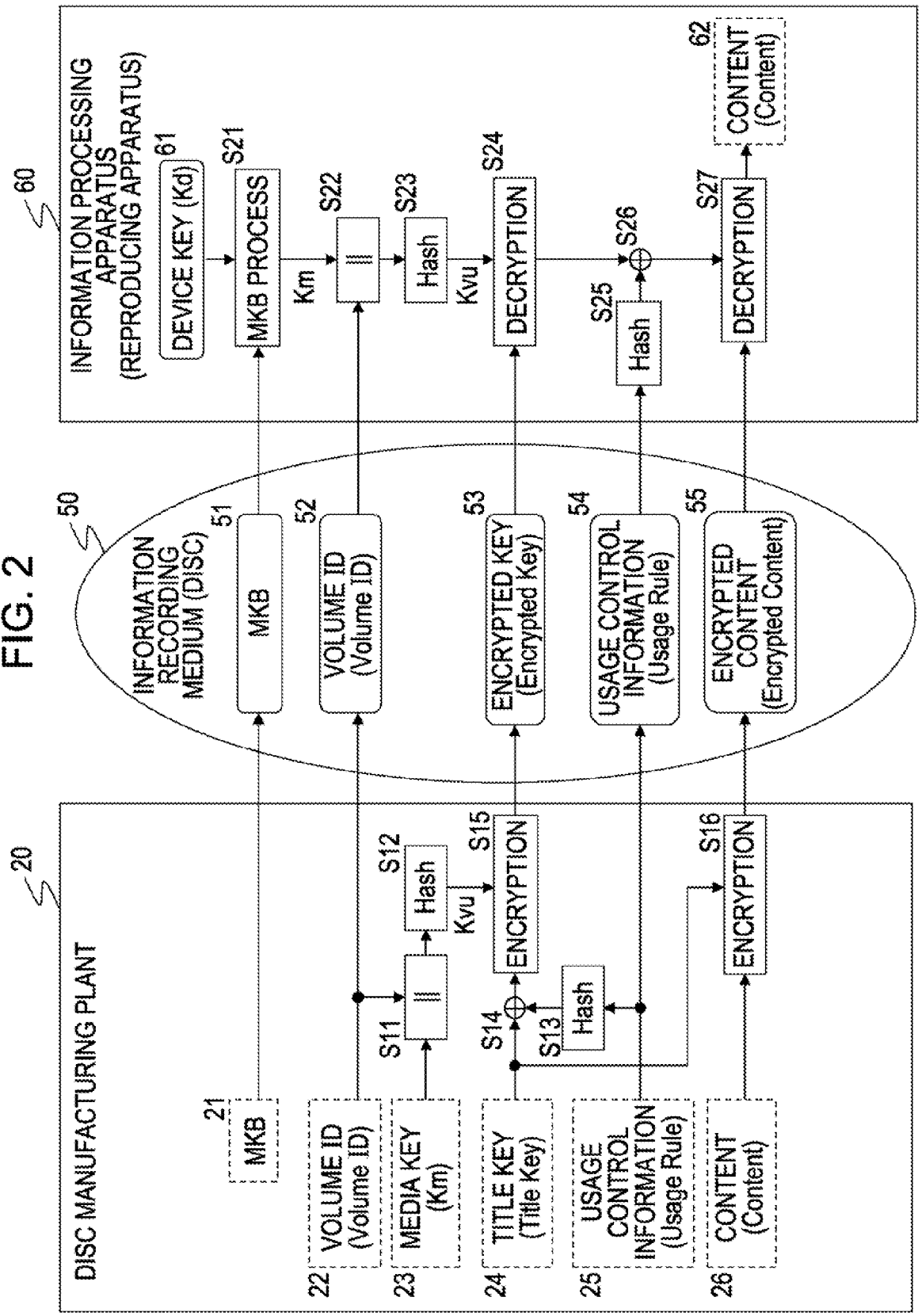
FIG. 2 is a diagram illustrating data recording and reproduction sequence with respect to an encrypted-content-recording disc according to the related art.
Figure 3:
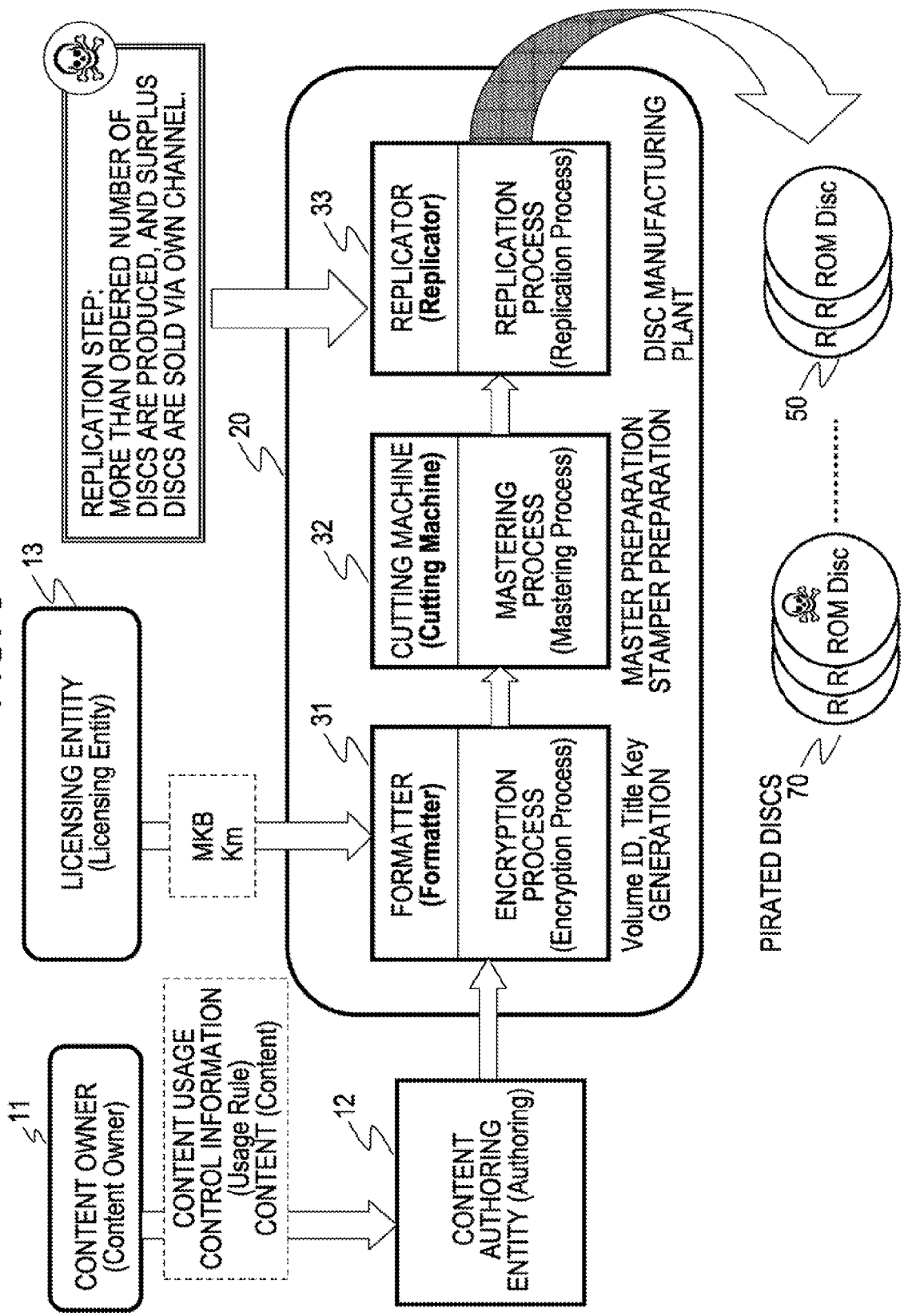
FIG. 3 is a diagram illustrating a manufacturing example of a pirated disc in a disc manufacturing process according to the related art.
Figure 7:
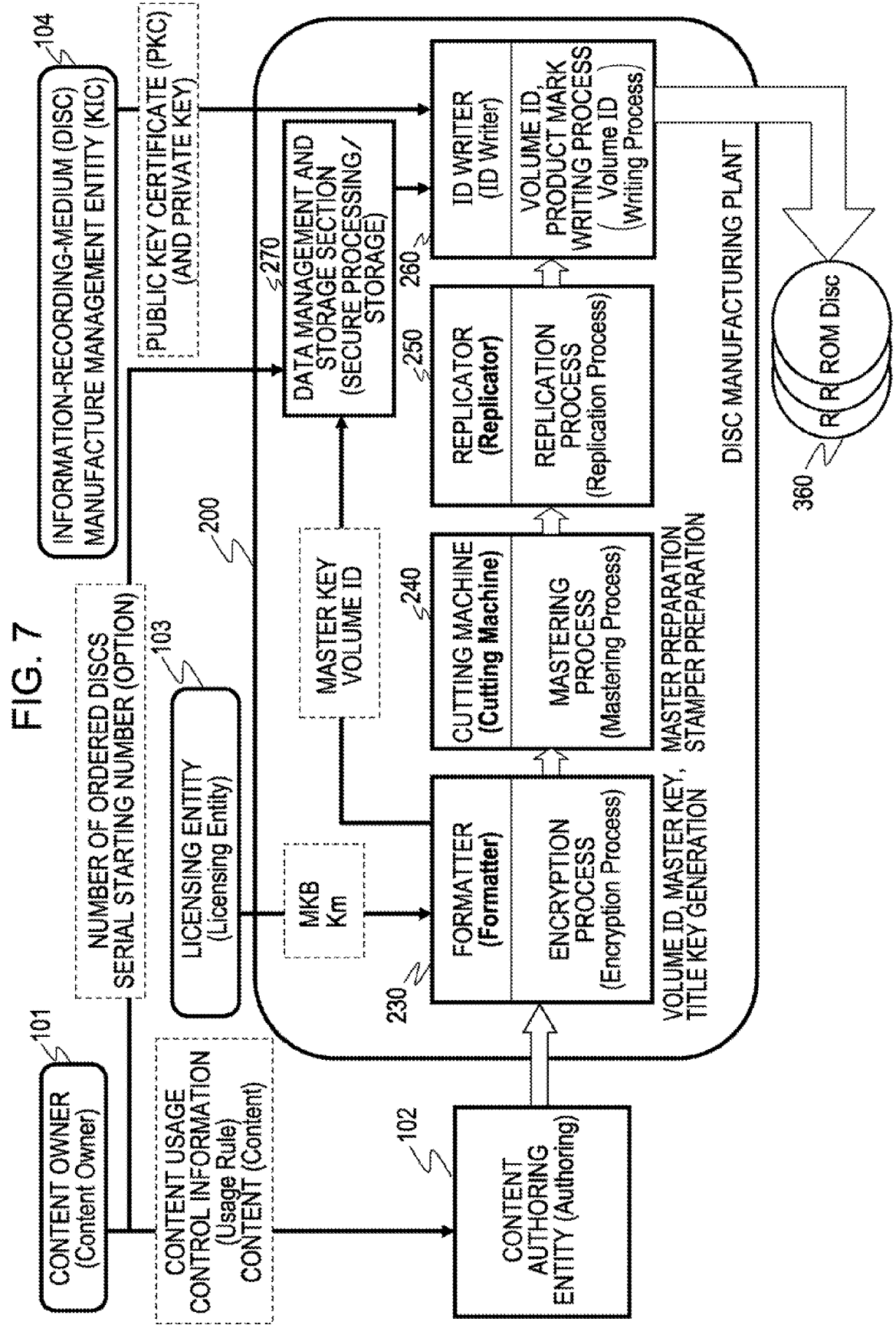
FIG. 7 is a diagram illustrating the configuration of a disc manufacturing process according to an embodiment of the present invention.

First, referring to FIG. 7, an information-recording-medium (disc) manufacturing process according to an embodiment of the present invention will be described. As described above with reference to FIG. 1, FIG. 7 is a diagram illustrating the manufacturing process for an ROM disc formed by an information recording medium storing content whose usage is permitted on the basis of a legitimate content usage right, for example, a DVD disc or BD disc. As shown in FIG. 7, content is delivered from a content owner 101 who owns the content to a content authoring entity 102 which performs content authoring and undergoes authoring, thereby generating authored content for disc recording. Thereafter, a disc 360 to be circulated into the market is manufactured at a disc manufacturing plant 200.

The content owner 101 delivers, together with content, usage control information (Usage Rule) that sets forth the usage right for the content, to the content authoring entity 102. The usage control information (Usage Rule) is set in correspondence with the content, for example, and includes information as to whether or not copying of the content is allowed. The usage control information is also stored together with the content onto the disc 360 that is finally delivered to the user. When using the content with a user device such as a reproducing apparatus, a content usage application executed on the user device refers to the usage control information, and executes the use of the content in compliance with the usage control information.

The disc manufacturing plant 200 receives the authored content from the content authoring entity 102 and the usage control information (Usage Rule), and further receives key information to be applied to content encryption and decryption from a licensing entity 103 that performs content usage management. The licensing entity 103 carries out content usage management, and generates various kinds of key data such as MKB (Media Key Block) and media key (Km) and provides these pieces of data to the disc manufacturing plant 200.

As described above, an MKB (Media Key Block) is an encryption key block generated on the basis of a tree-structure key distribution scheme known as one type of a broadcast encryption scheme. The MKB is a key information block allowing the acquisition of a media key (Km), which is a key necessary for decryption of content, only by processing (decryption) based on a device key (Kd) stored in an information processing apparatus of a user with a valid license. The MKB represents an application of an information distribution scheme according to a so-called hierarchical tree structure. The acquisition of the media key (Km) is allowed only when the user device (information processing apparatus) has a valid license, and the media key [Km] cannot be acquired by a revoked user device.

The licensing entity 103 can generate an MKB configured so that, through a change of the device key used for encryption of key information stored in the MKB, decryption, that is, acquisition of a media key required for content decryption, cannot be performed with a device key stored in a specific user device. Accordingly, it is possible to provide encrypted content that can be decrypted only with respect to a device with a valid license by revoking an unauthorized device at arbitrary timing.

The disc manufacturing plant 200 further receives, from an information-recording-medium (disc) manufacture management entity (KIC) 104, a public key certificate (PKC) storing a public key corresponding to the disc manufacturing plant 200 or a manufacturing machine in the disc manufacturing plant 200, and a private key corresponding to the public key. Specifically, the disc manufacturing plant 200 receives, for example, a public key certificate (PKC) storing a public key corresponding to a replicator 250 or an ID writer 260 that will be described later, and a private key corresponding to the public key. While the replicator 205 and the ID writer 250 are depicted as separate components in the drawing, these components may be formed as a single device, or the ID writer 260 may be incorporated into the replicator 250. In this case, a public key certificate (PKC) storing a public key corresponding to the replicator 250, and a private key corresponding to the public key are received from the information-recording-medium manufacture management entity (KIC) 104.

At the disc manufacturing plant 200, a formatter 230 executes such processing as content encryption and formatting of each piece of data. Further, the preparation of a master or stamper based on the formatted data is executed by a cutting machine 240. Thereafter, in the replicator 250, a large number of discs are manufactured as replicas by using the stamper. Further, the ID writer 260 is applied with respect to the manufactured discs to record an ID as a unique identifier onto each of the discs, thereby completing the disc 360 with the content stored. It should be noted that the data recorded onto the respective discs with the ID writer 260 are a product mark and an encrypted volume ID, and at least one of these pieces of data is recorded by a reflective film removal method. The configuration and recording method of recording data will be described later in detail.

The disc manufacturing plant 200 has a data management and storage section 270 that executes data management and data storage. The data management and storage section 270 stores the number of ordered discs corresponding to the production number of discs permitted by the content owner 101 and, as required, holds the starting number of a serial number to be set with respect to a disc given by the content owner 101. Further, the data management and storage section 270 stores data generated by the formatter 230 at the disc manufacturing plant 200, for example, a master key and a volume ID. These pieces of data are inputted to the ID writer 260. The holding and transfer of these pieces of data are executed under secure data management with no leakage/tampering or the like by using a LAN, a dedicated line, a smart card, or the like within the disc manufacturing plant 200.

By using data inputted from the data management and storage section 270, and the public key certificate (PKC) and the private key that are received from the information-recording-medium (disc) manufacture management entity 104, the ID writer 260 executes a process of generating different recording information for every single disc and recording the recording information onto each disc, thereby completing the disc 360 with the content stored. It should be noted that the data recorded onto the respective discs with the ID writer 260 are a product mark and an encrypted volume ID, and at least one of these pieces of data is recorded by a reflective film removal method. The configuration and recording method of recording data will be described later in detail.

Figure 8:
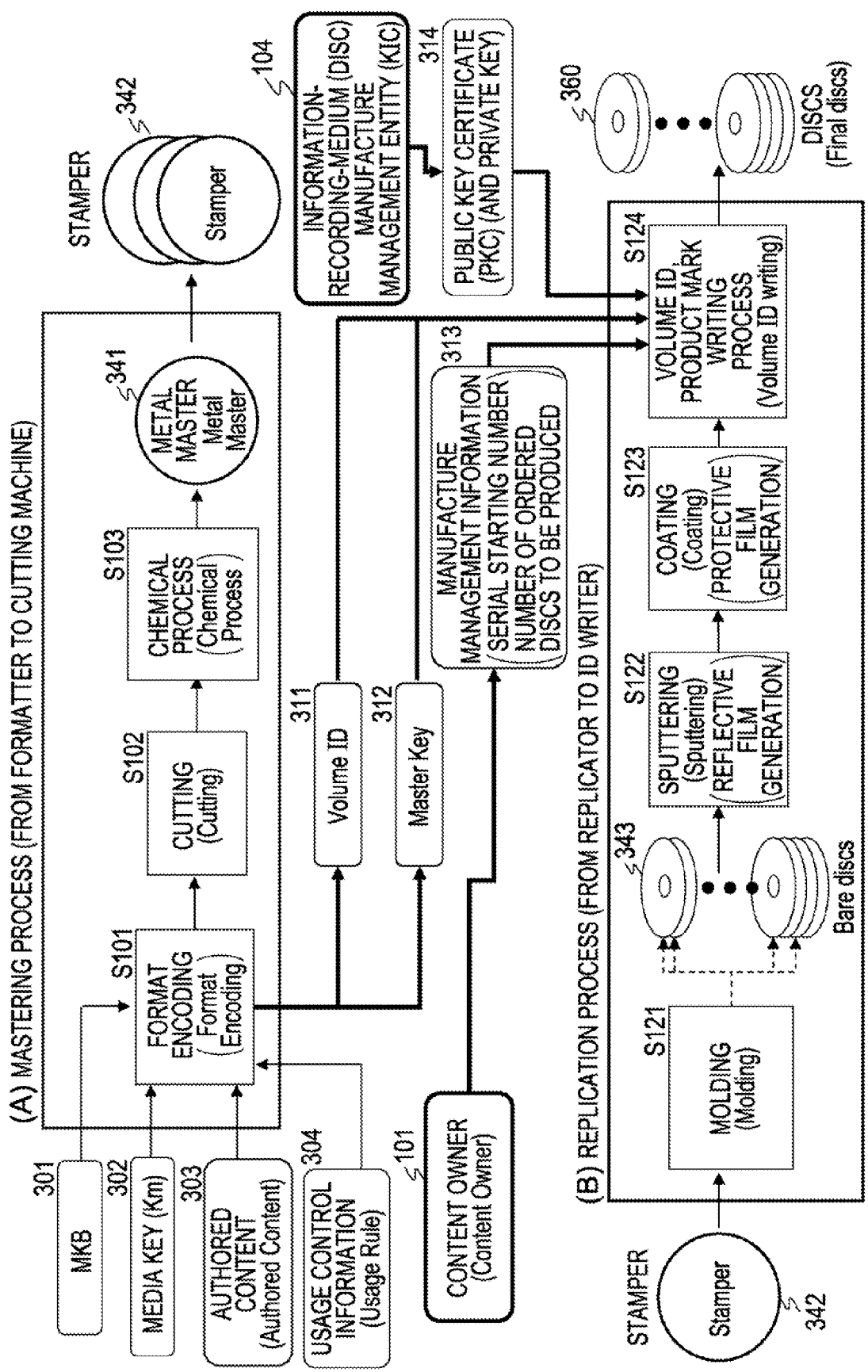
FIG. 8 is a diagram illustrating the configuration of a disc manufacturing process according to an embodiment of the present invention.

Referring to FIG. 8, a series of processes executed at the disc manufacturing plant 200 will be described. The (A) mastering process in the upper half of FIG. 8 illustrates a process executed by the formatter 230 and the cutting machine 240 shown in FIG. 7, and the (B) replication process in the lower half of FIG. 8 illustrates a process executed by the replicator 250 and the ID writer 260 shown in FIG. 7.

Step S101 represents processing in the formatter 230 shown in FIG. 7. In step S101, an MKB (Media Key Block) 301 as key information applied to a content encryption and decryption process, and a media key (Km) 302 are inputted from the licensing entity, and authored content 303 and usage control information (Usage Rule) 304 are received from the content authoring entity, and generation of data to be recorded onto the disc, that is, encryption and formatting of recording data such as content are executed. In the course of this process, the formatter 230 generates a volume ID, a master key, a title key, and the like by, for example, a random-number generating process. The details of these processes will be described later with reference to FIG. 9 and the like.

The volume ID, the master key, and the title key are data set in correspondence to, for example, one authored content in the formatter 230 shown in FIG. 230, and each set as a value common to a predetermined number of discs produced. As described above with reference to FIG. 7, after stored onto the data management and storing section 270, the volume ID and the master key are inputted to the ID writer 260, and applied to the generation of writing data in the ID writer. The title key is used as a content encryption key. These processes will be described later.

Figure 4:
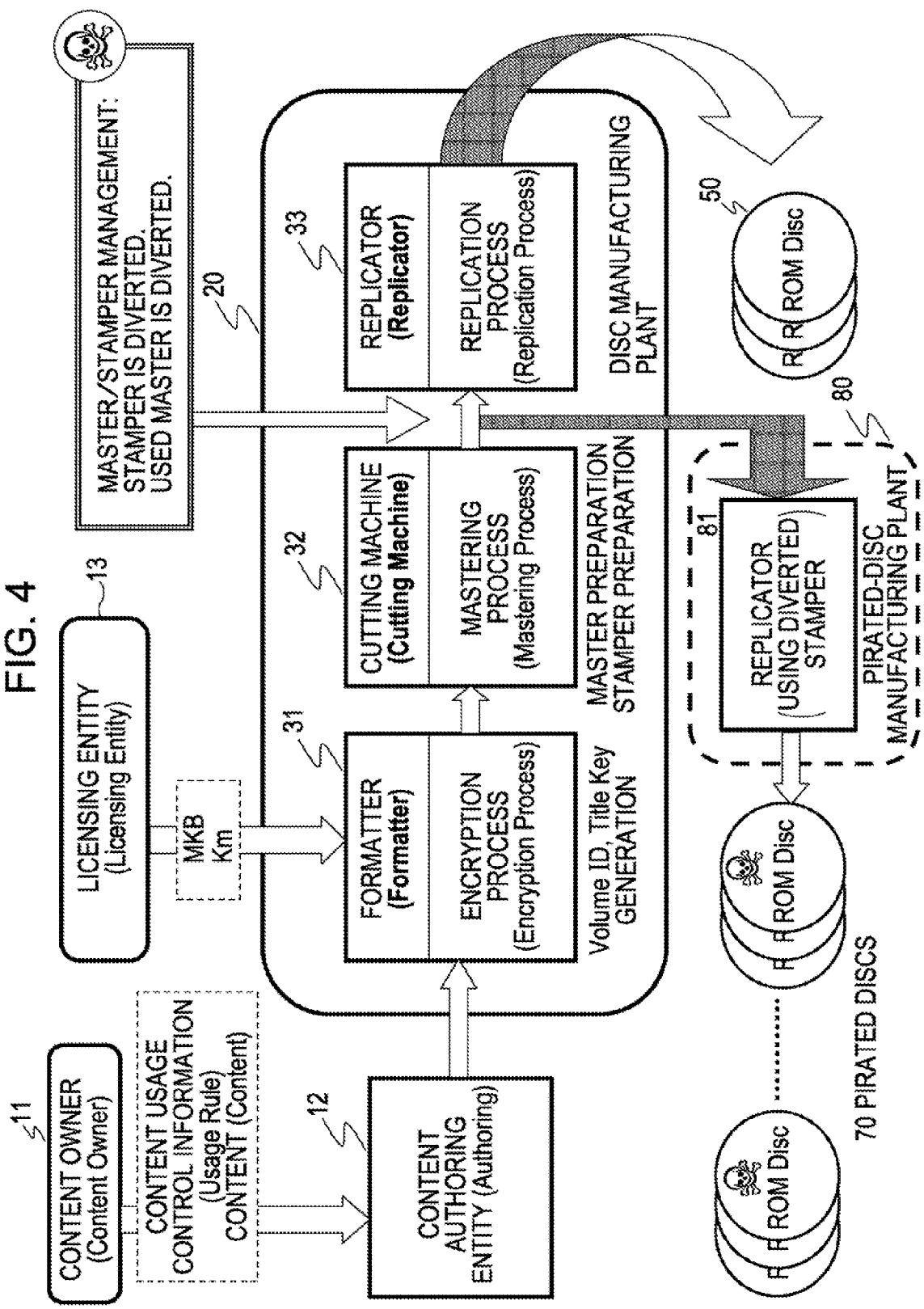
FIG. 4 is a diagram illustrating a manufacturing example of a pirated disc in a disc manufacturing process according to the related art.
Figure 5:
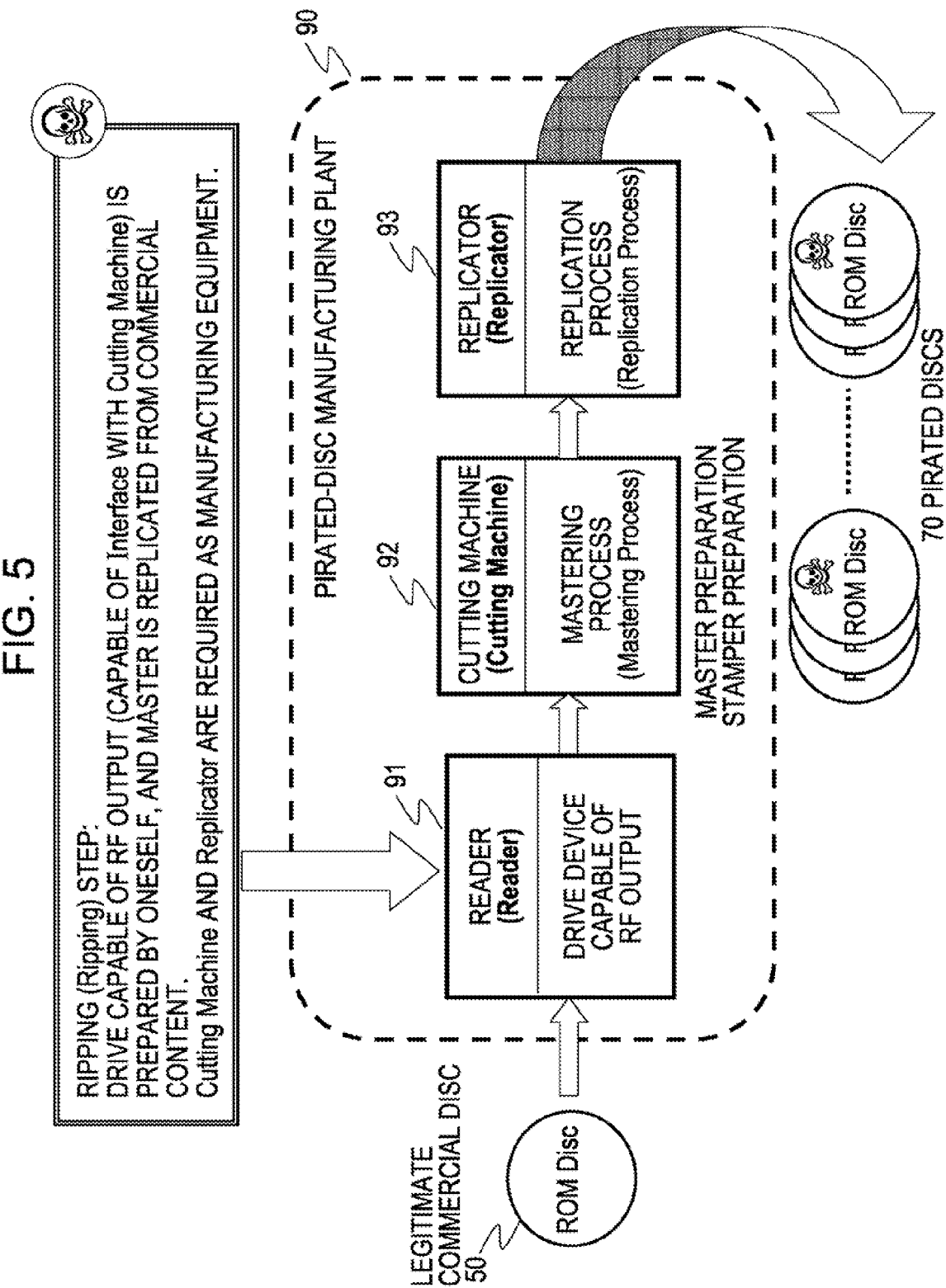
FIG. 5 is a diagram illustrating a manufacturing example of a pirated disc in a disc manufacturing process according to the related art.

When the content encryption and formatting process by the formatter 230 in step S101 have been finished, the cutting and chemical processes in steps S102 and S103 are executed, generating a metal master 341 and a stamper 342. These processes are executed by the cutting machine 240 shown in FIG. 4. This process corresponds to a step of generating a master or stamper having a pit pattern serving as a recording signal corresponding to the formatted data including encrypted content generated by the formatter 230, and is the same process as the process employed in the related art.

Next, the process transfers to the replication process of FIG. 8(B). Steps S121 to S123 are processing of the replicator 250 shown in FIG. 7. Through molding in step S121, a bare disc 343 as a data recording disc with the pit pattern of the stamper copied thereto is manufactured, and through sputtering in step S122, a reflective film is generated. Further, in step S123, a protective film is generated by coating.

The process of step S124 corresponds to the processing of the ID writer 260 shown in FIG. 7. In this process, the ID writer 260 performs writing of different data for every single data-recorded disc. The data to be recorded onto each disc with the ID writer 260 includes a product mark and an encrypted volume ID, and at least one of these pieces of data is recorded by a reflective film removal method. The disc 360 is completed through these processes.

In the processing according to the present invention, the processing of the formatter 230 and the processing of the ID writer 260 shown in FIG. 7 differ greatly from those in the related art. The details of the processing of the formatter 230 and the processing of the ID writer 260 will be described later.

[2. Details of Disc Manufacturing Process]

Figure 9:
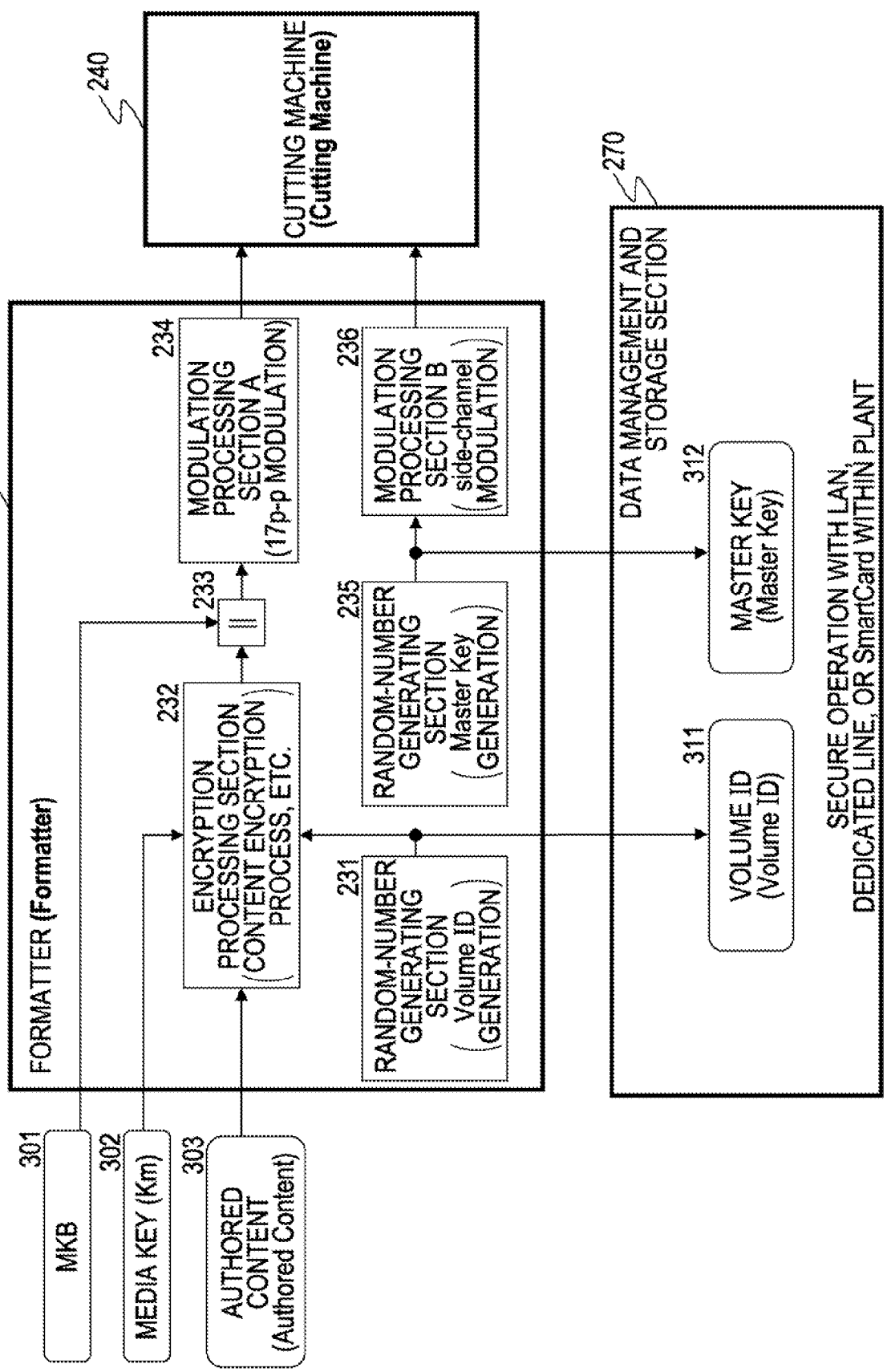
FIG. 9 is a diagram illustrating a processing example of a formatter applied to disc manufacture according to an embodiment of the present invention.

In the processing according to the present invention, mainly the processing of the formatter 230 and the processing of the ID writer 260 shown in FIG. 7 differ greatly from those in the related art. Referring to FIG. 9 onwards, the processing of the formatter 230 and the processing of the ID writer 260 will be described in detail. First, as the example of processing by the formatter, two processing examples will be described with reference to FIGS. 9 and 10.

(2.1) Processing Example 1 of Formatter

Referring to FIG. 9, a first example of formatter processing will be described. In the formatter 230 shown in FIG. 9, the MKB (Media Key Block) 301 as key information applied to a content encryption and decryption process, and the media key (Km) 302 are inputted from the licensing entity, and the authored content 303 and usage control information (Usage Rule) (not shown) are received from a content authoring entity, and generation of data to be recorded onto a disc, that is, encryption and formatting of recording data such as content are executed.

The formatter 230 shown in FIG. 9 generates a volume ID based on random numbers in a random-number generating section 231. A volume ID is an ID commonly applied to a plurality of discs, with each authored content 303 or stamper as a unit, for example. The volume ID is inputted to an encryption processing section 232, and a series of encryption sequence using the media key 302 and other data is executed, thereby executing content encryption, and generation and encryption of other recording data. The specific encryption sequence will be described later with reference to FIGS. 17 and 18.

In a data concatenating section 233, recording data containing the encrypted content generated in the encryption processing section 232, and the MKB 301 are concatenated. The concatenated data is subjected to a modulation process executed in a modulation processing section A234 before being outputted to the cutting machine 240. For example, the 17p-p modulation scheme is employed for the modulation process executed in the modulation processing section S234. Unlike a modulation scheme with a fixed bit length (8 bits) such as the EFM or EFM Plus modulation scheme, in the 17p-p modulation scheme, a modulation unit is 2 bits.

Further, a random-number generating section 235 of the formatter 230 generates a master key based on random numbers. The master key is also key data commonly applied to a plurality of discs with each authored content 303 or stamper as a unit, for example. In a modulation processing section B236, a modulation process different from that executed in the modulation processing section A234, for example, a side-channel modulation process is executed with respect to the generated master key, and the resultant master key is outputted to the cutting machine 240.

While data recorded onto a disc as a result of the modulation process executed in the modulation processing section A234 can be read by a standard content reproduction method executed on the user device, in the modulation processing section B234, it is necessary to apply a special reproduction method when reproducing data recorded as a result of the modulation process in the modulation processing section B234.

That is, reading of a master key requires a data reading process to which a special reproduction method such as side-channel modulation or ROM-Mark decoding is applied. A reproducing application on the user device for executing a content reproduction process executes such special data reading process to perform reading of the master key. The details of the reproduction process will be described later with reference to FIG. 17 and the like.

The volume ID generated in the random-number generating section 231, and the master key generated in the random-number generating section 235 are stored onto the data management and storage section 270. These correspond to a volume ID 311, and a master key 312 shown in the drawing. These pieces of data are inputted to the ID writer 260 under secure management, and applied to the generation of data that is to be written into a disc with the ID writer. Description on this process will be given later. It should be noted that the volume ID and the master key are data used for the decryption process of encrypted content recorded onto a disc. The details of the decryption process will be described later with reference to FIG. 17 and the like.

According to the processing of the formatter 230 described above with reference to FIG. 9, the encrypted content and the master key are inputted to the cutting machine 240 and recorded onto the master or stamper. At this time, the volume ID, which is data used for the decryption process of encrypted content recorded onto a disc, is not inputted to the cutting machine 240 and hence not recorded onto the metal master (original disk) or stamper. Since the volume ID is not recorded on the metal master (original disk) or stamper, even when the metal master (original disk) or stamper is diverted from the plant, replica discs cannot be reproduced with this metal master or stamper alone.

(2.2) Processing Example 2 of Formatter

Figure 10:
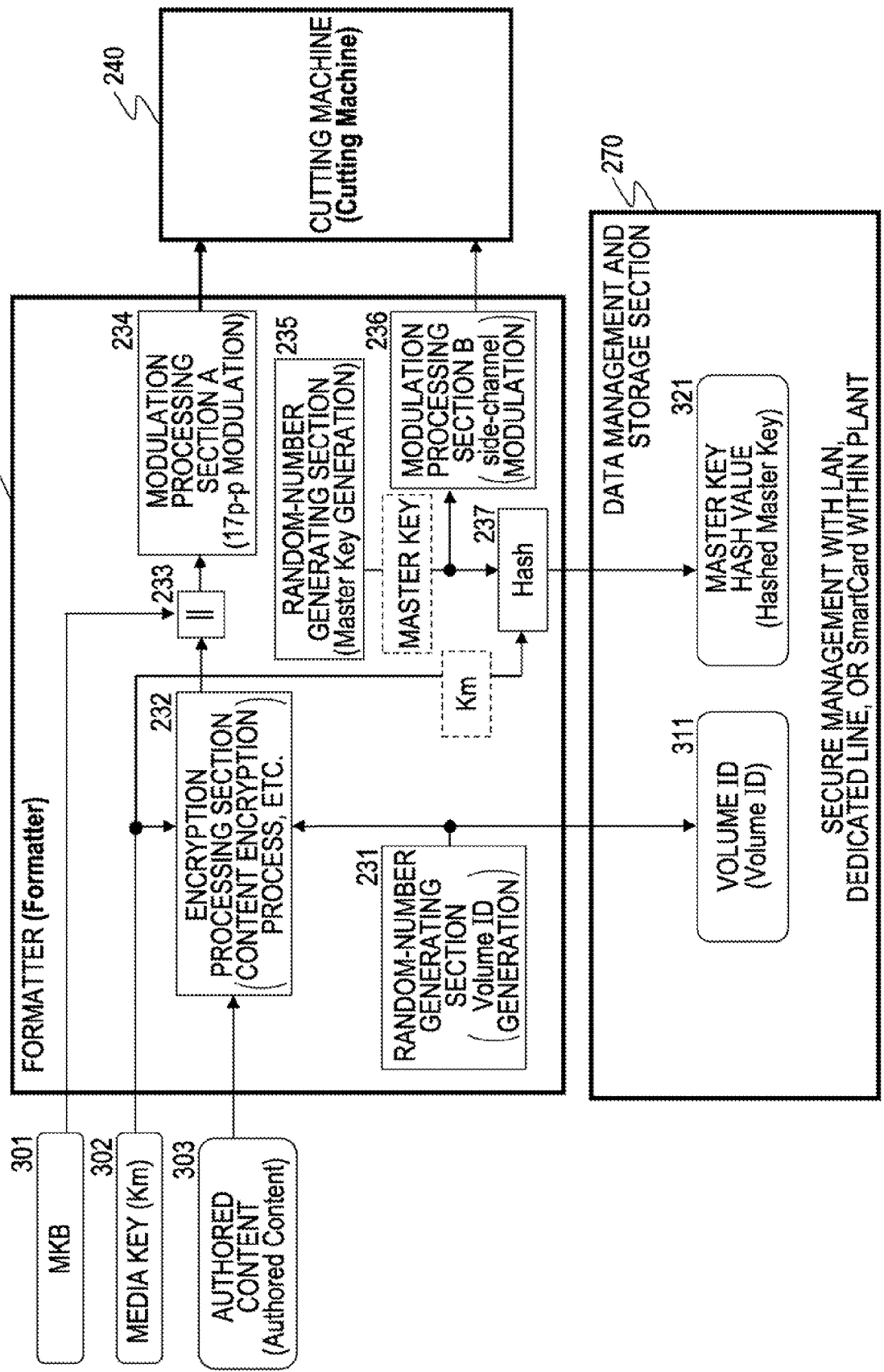
FIG. 10 is a diagram illustrating a processing example of a formatter applied to disc manufacture according to an embodiment of the present invention.

Referring to FIG. 10, a second example of formatter processing will be described. The formatter 230 shown in FIG. 10 differs from the formatter 230 shown in FIG. 9 only in that a hash process employing the media key (Km) 302 is executed in a hash processing section 237 with respect to a master key generated in the random-number generating section 235, and the resultant data is stored onto the data management and storage section 270. Otherwise, the configuration and processing are the same as those of FIG. 9.

In the configuration shown in FIG. 10, the volume ID generated in the random-number generating section 231, and the hash value of the master key generated in the random-number generating section 235 are stored onto the data management and storage section 270. These correspond to a volume ID 311 and a master key hash value 321. These pieces of data are inputted to the ID writer 260 under secure management, and applied to generation of data that is to be written into a disc with the ID writer. This process will be described later. It should be noted that the volume ID and the master key hash value are data used for the decryption process of encrypted content to be recorded onto a disc. The details of the decryption process will be described later with reference to FIG. 17 and the like.

(2.3) Processing Example 1 of ID Writer

Next, an example of processing in the ID writer 260 shown in FIG. 7 will be described. The ID writer executes a process of generating and recording different recording data for every single content-recording disc generated by the replicator 250 shown in FIG. 7.

Figure 11:
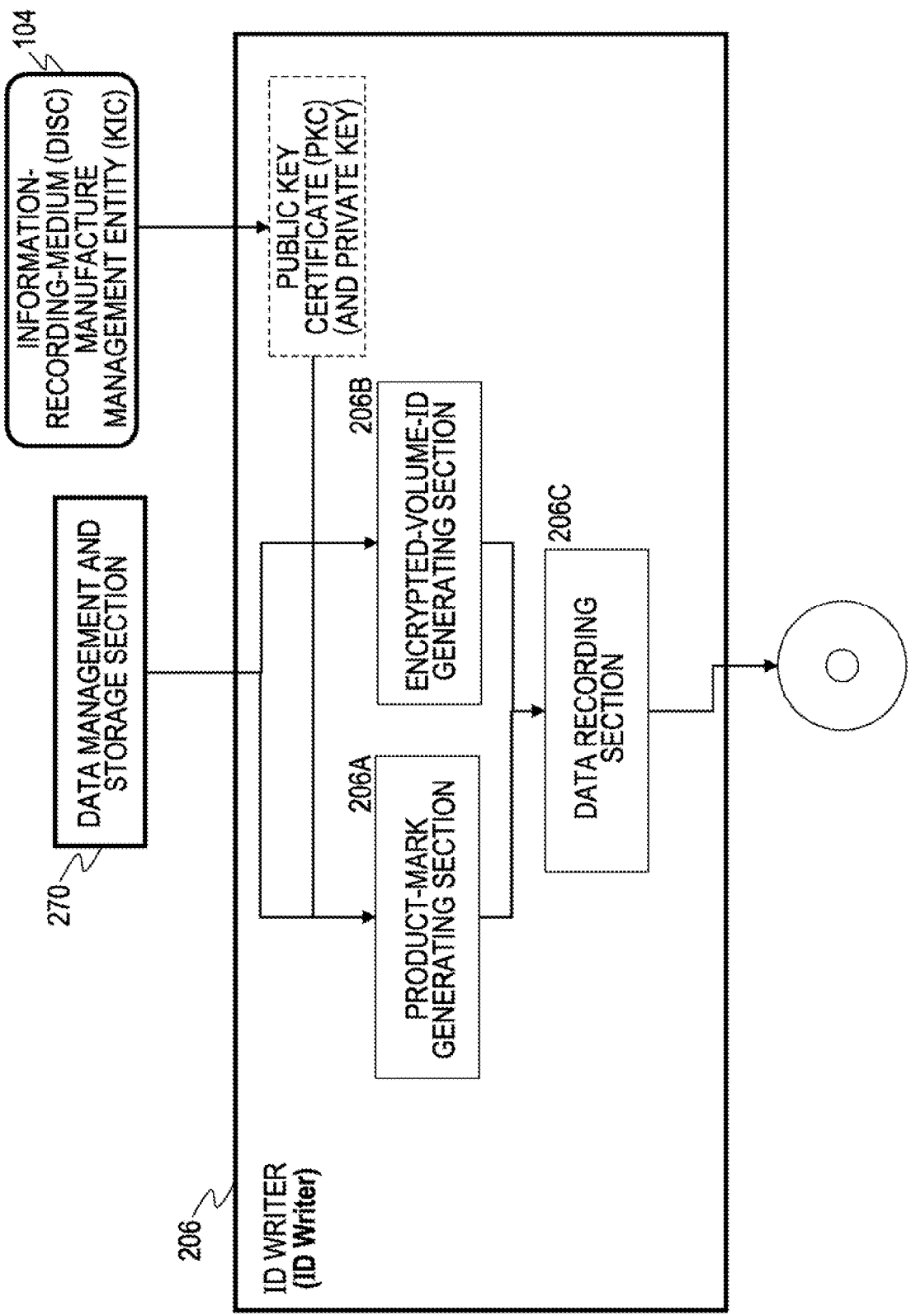
FIG. 11 is a diagram illustrating a processing example of an ID writer applied to disc manufacture according to an embodiment of the present invention.

As shown in FIG. 11, by using data inputted from the data management and storage section 270, and the public key certificate (PKC) and the private key that are received from the information-recording-medium (disc) manufacture management entity 104, the ID writer 260 executes the process of generating different recording information for every single disc and recording the recording information onto each disc. The data to be recorded onto each disc are a product mark and an encrypted volume ID, and at least one of these pieces of data is recorded by a reflective film removal method.

As shown in FIG. 11, the ID writer 260 has a product-mark generating section 260A that generates a product mark containing a public key certificate issued with respect to a disc manufacturing entity or to equipment applied to disc manufacture, an encrypted-volume-ID generating section 260B that generates an encrypted volume ID as data obtained by performing encryption on a result of computation based on a product-mark-associated value such as a hash value generated on the basis of the product mark, and a volume ID as an identifier set with respect to a given set of discs to be manufactured, and a data recording section 260C that records the product mark and the encrypted volume ID for each individual disc. The data recording section 260C records at least one of the product mark and the encrypted volume ID by a reflective-film-removal recording method.

Figure 12:
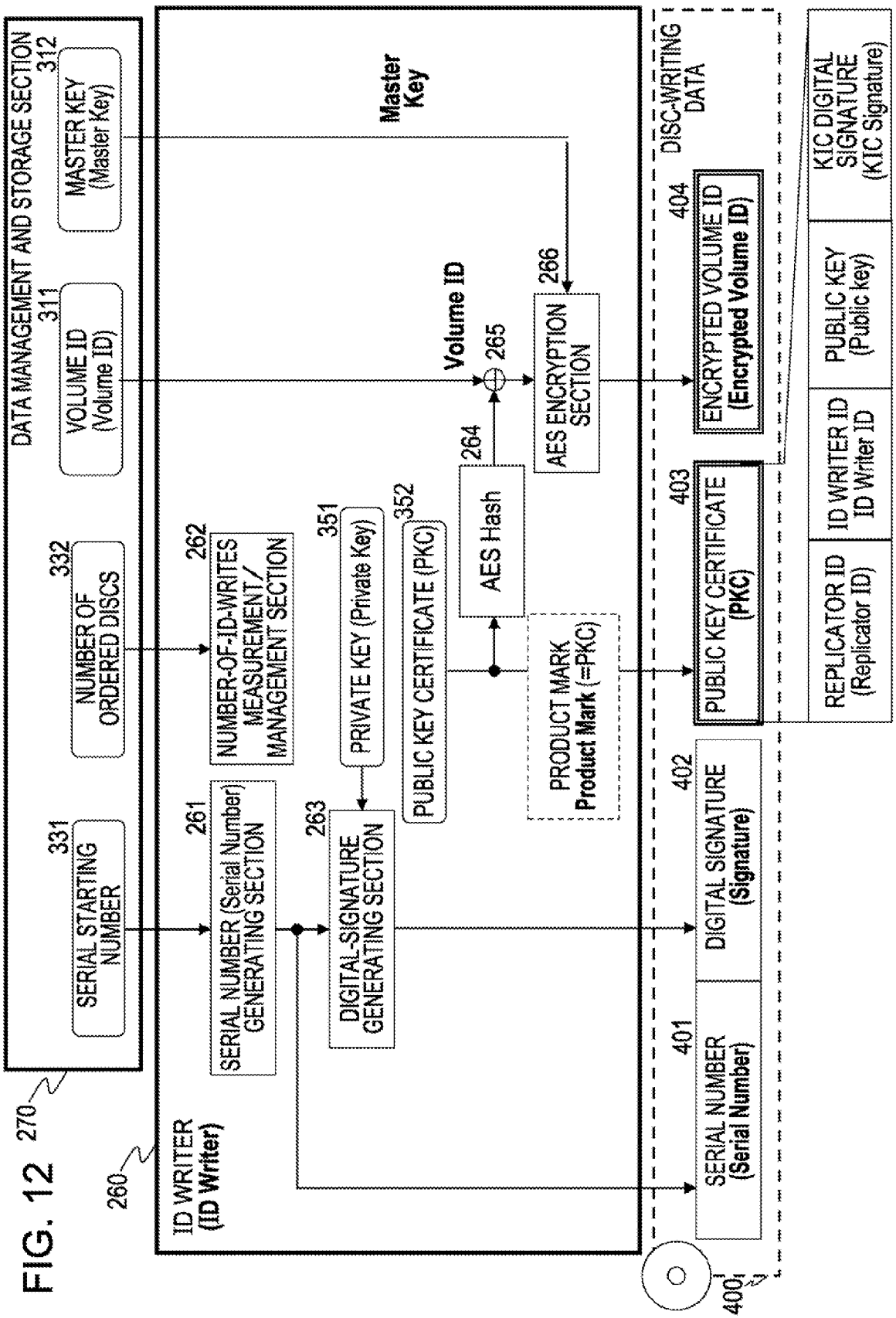
FIG. 12 is a diagram illustrating a processing example of an ID writer applied to disc manufacture according to an embodiment of the present invention.

First, Processing Example 1 of the ID writer will be described with reference to FIG. 12. The upper part of FIG. 12 shows data stored in the data management and storage section 270, the middle part shows processing of the ID writer 260, and the lower part shows disc-writing data 400.

The data management and storage section 270 stores a serial starting number 331 and the number of ordered discs 332 received from the content owner 101 described above with reference to FIG. 7, and the volume ID 311 and the master key 312 generated by the formatter 230. While in this example the description is directed to an example of processing to which the master key 312 is applied, the master key hash value described above with reference to FIG. 10 may also be applied.

It should be noted that as described above with reference to FIG. 7, the ID writer 260 holds a public key certificate (PKC) storing a public key corresponding to a disc manufacturing plant or manufacturing equipment (equipment including the ID writer) received from the information-recording-medium (disc) manufacture management entity (KIC) 104, and a private key 351 corresponding to the public key.

On the basis of these pieces of data, the ID writer 260 generates different recording data for each disc, that is, a product mark and an encrypted volume ID. In the processing example shown in FIG. 12, the product mark is the public key certificate (PKC) received from the information-recording-medium (disc) manufacture management entity (KIC) 104.

Processing in the ID writer 260 will be described with reference to FIG. 12. It should be noted that the processing shown in FIG. 12 is executed for each disc. First, in a serial number generating section 261, a serial number to be set for a disc is generated on the basis of the serial starting number 331 received from the content owner 101. For example, if the serial starting number received from the content owner 101 is 10001, and the number of ordered discs is 1000, serial numbers 10001 to 11000 are assigned to the respective discs. A number-of-ID-writes measurement section 262 performs management of the number of discs for which ID writing process by the ID writer 260 has been executed, and permits processing only up to the number of ordered discs.

A digital signature generating section 263 generates a digital signature by applying the private key 351 managed by the information-recording-medium (disc) manufacture management entity (KIC) 104 with respect to the serial number generated by the serial number generating section 260, and records the serial number and the digital signature as the constituent data of the disc-writing data 400. These correspond to a serial number 401 and a digital signature 402 in the disc-writing data 400. In this Processing Example 1, the serial number 401 and the digital signature 402 are not components of a product mark, and these pieces of data may be recorded as data that can be reproduced by a standard data reproduction process, or may be recorded by applying a method requiring a special data recording and reproduction process, such as a BCA method (burst cutting) or code recording method.

In Processing Example 1, a public key certificate (PKC) 352 received from the information-recording-medium (disc) manufacture management entity (KIC) 104 is written into a disc as a product mark. This corresponds to a public key certificate (PKC) 403 included in the disc-writing data 400 shown in the drawing. The public key certificate includes a replicator ID as an identifier for a replicator, an ID writer ID as an identifier for an ID writer, and further, a public key, and a digital signature of the information-recording-medium (disc) manufacture management entity (KIC) with respect to these pieces of data.

Further, an AED hash section 264 of the ID writer 260 calculates the hash value of the public key certificate (PKC) 352 received from the information-recording-medium (disc) manufacture management entity (KIC) 104, and a computation process between this with the volume ID 311 generated by the formatter 230 and stored in the data management and storage section 270 is executed by a computing section 265. The computation executed by the computing section 265 is, for example, an exclusive OR operation (XOR). Further, the computation result is inputted to an AES encryption section 266, and an AES encryption process with the master key 312 generated by the formatter 230 and stored in the data management and storage section 270 is executed to thereby generate an encrypted volume ID.

The encrypted volume ID generated by the AES encryption section 266 is written into a disc. This corresponds to an encrypted volume ID 404 in the disc-writing data 400 shown in the drawing.

At least one of the public key certificate 403 and the encrypted volume ID 404 in the disc-writing data 400 which each serve as a product mark is written into each disc by a reflective-film removal method.

Figure 13:
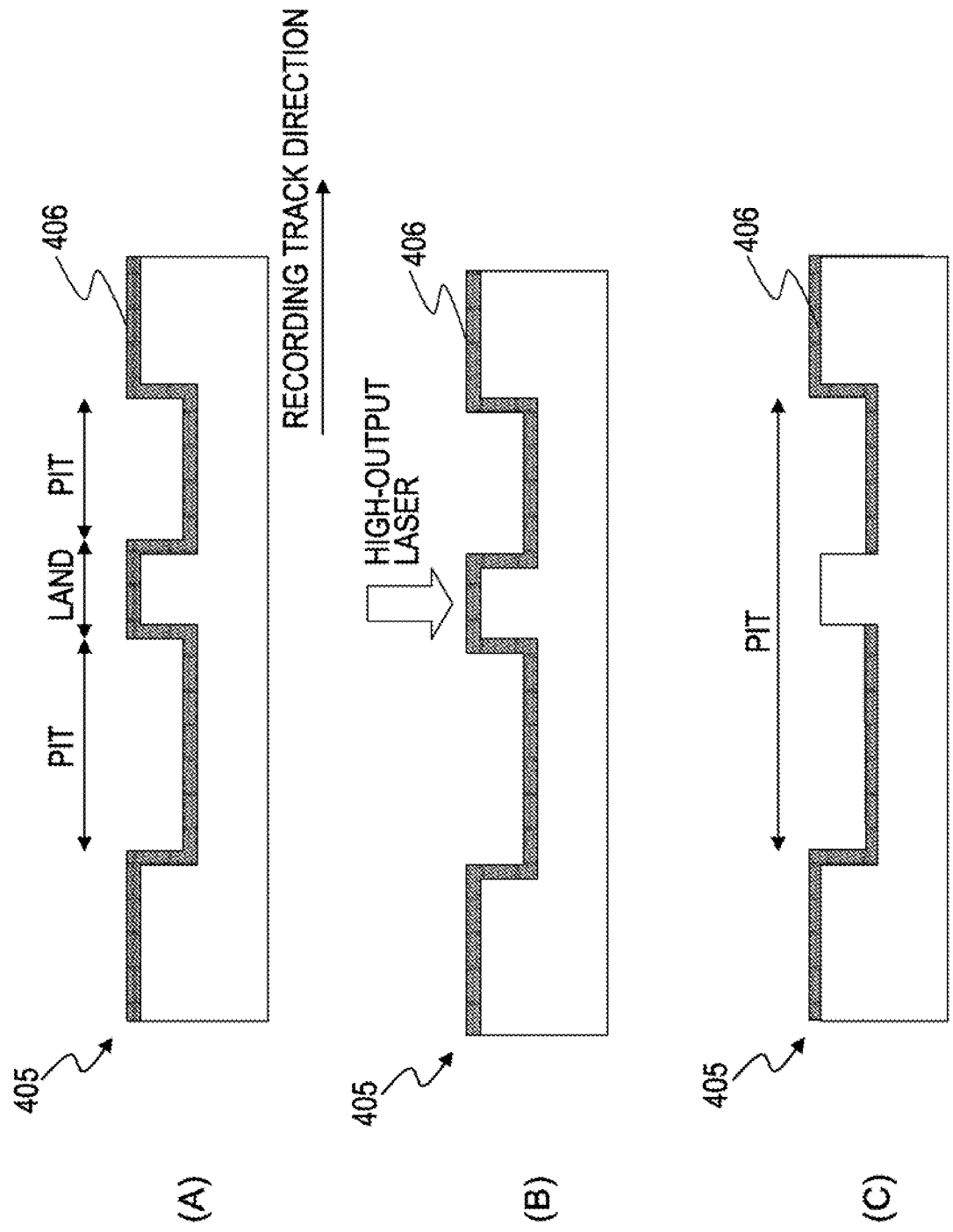
FIG. 13 is a diagram illustrating a data recording process by a reflective film removal method.

The reflective-film removal method will be described with reference to FIG. 13. In the data recording track on a disc 405, pits and lands as predetermined irregular patterns are formed in advance, and a reflective film 406 is set. The reflective-film removal method is a method using a laser radiation process, in which a high-output laser beam is radiated to a land at a predetermined position within the track, thereby turning the land into a pit to perform recording. That is, a region where a land can be turned into a pit is provided in a plurality of portions on the recording region, and a laser beam is radiated to each of the portions while determining whether each portion is to be turned into a pit or to be left as the land as it is in accordance with the bit information of the product mark and volume ID as recording data.

Specifically, as shown in FIG. 13(B), a high-output laser beam is radiated to a land at a given predetermined position. The high-output laser beam has such power that is sufficiently higher than reproducing power and causes the reflective film of the land to melt. When a high-output laser beam is radiated to the land in this way, as shown in FIG. 13(C), the reflective film 406 coated on the land melts and disappears. When light is radiated to the portion where the reflective film 406 has thus disappeared, no reflected light is returned. That is, that portion exhibits reflection characteristics equivalent to a pit. In this way, after transferring a pit/land pattern with a stamper, the land is turned into a pit, thereby making it possible to record a bit pattern different from the original bit pattern generated with the stamper.

Figure 14:
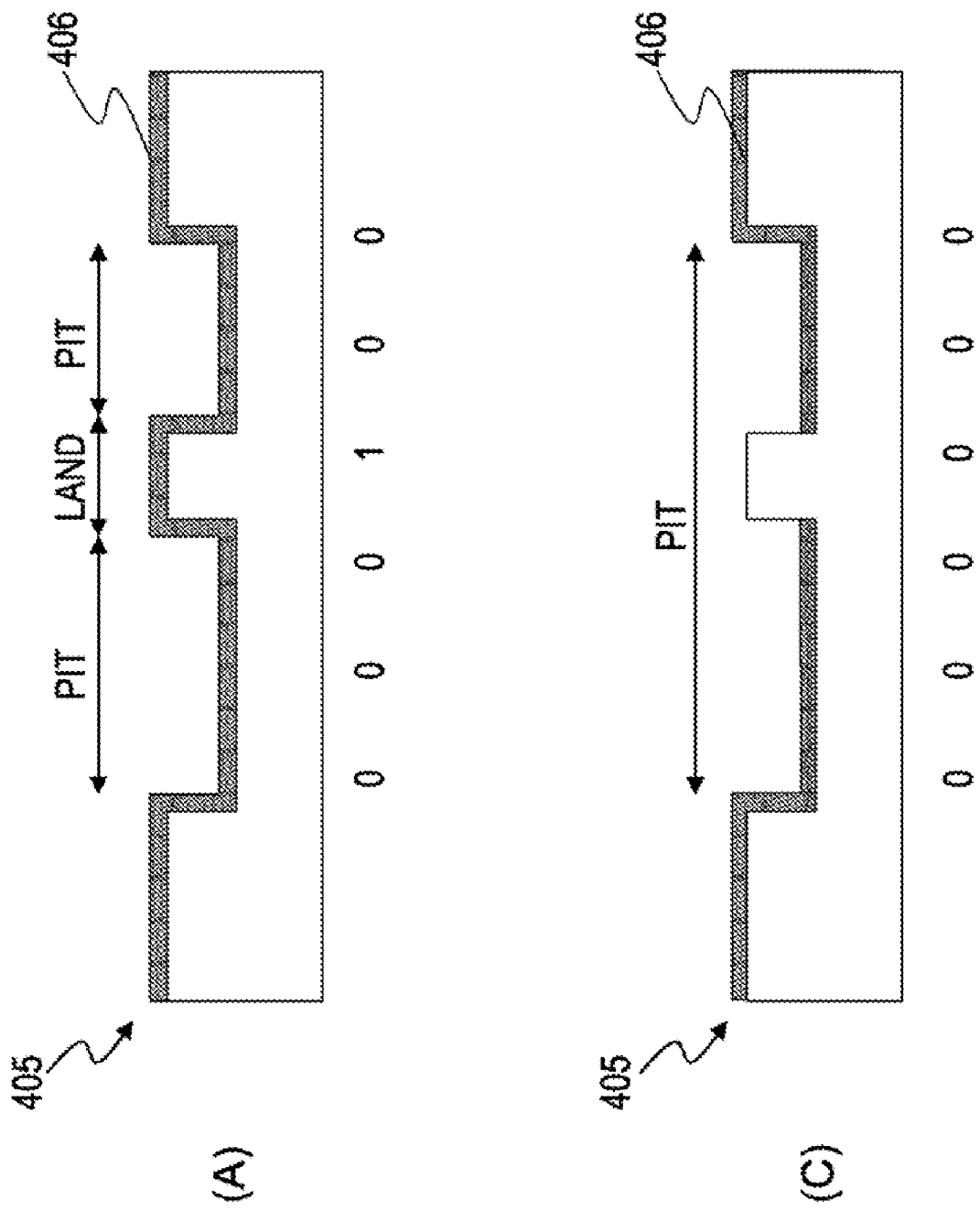
FIG. 14 is a diagram illustrating a data recording process by a reflective film removal method.

That is, as shown in FIG. 14(A), when the pit=0 and the land=1, the bit pattern before removal of a reflective film is 000100. After the removal of the reflective film, the bit pattern becomes 000000. In this way, a predetermined bit pattern is generated through reflective film removal, and at least one of the product mark including the public key certificate 403, and the volume ID 404 is written by applying the reflective film removal method. Both of these pieces of data may be written by the reflective film removal method. When the reflective film removal method is not applied to writing of one of these pieces of data, the writing of that data is performed by a standard data recording method, a side-channel method, or an ROM mark method.

Figure 6:
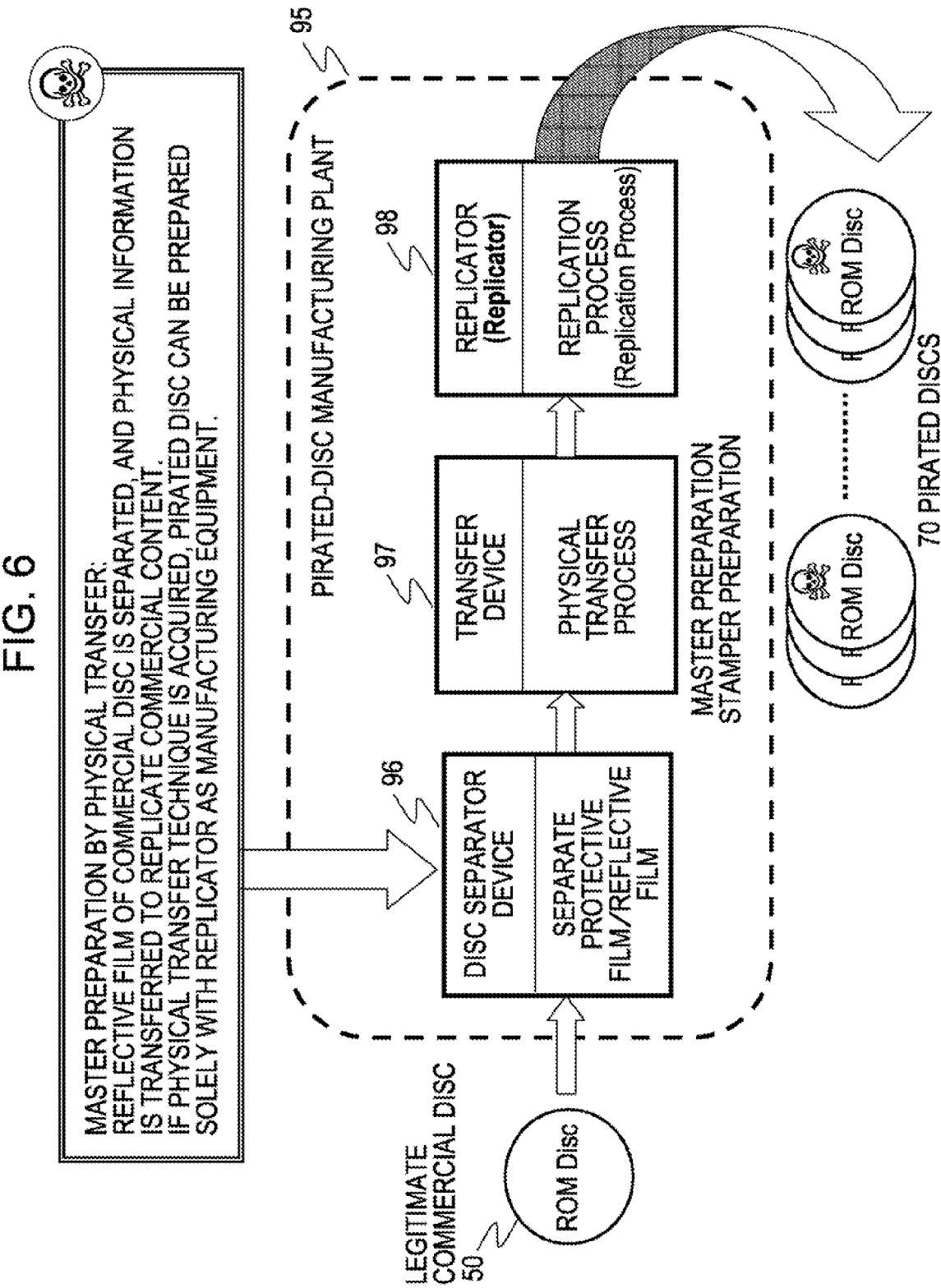
FIG. 6 is a diagram illustrating a manufacturing example of a pirated disc in a disc manufacturing process according to the related art.

A case is considered where the pirated-disc manufacturing method described above with reference to FIG. 6, that is, the production of pirated discs by physically copying a pit pattern from a legitimate commercial disc, is executed on the basis of a disc having data that has been recorded by the above-mentioned reflective-film-removal recording method. Since the produced pirated disc is generated by physically copying a pit pattern and coating a reflective film on the entire surface, a reflective film is also formed in a portion corresponding to the reflective-film-removed portion in a legitimate disc. As a result, data read from the reflective-film-removed portion of the legitimate disc and data read from the pirated disc are different from each other.

In Processing Example 1, at least one of the public key certificate 403 as a product mark, and the encrypted volume ID 404 is recorded by this reflective film removal method. These pieces of data are set as information for generating a key that is to be applied to decryption of content. Specific content encryption/decryption sequence will be described with reference to FIG. 17 onwards.

In a pirated disc, content decryption is impossible because at least one of the product mark and the encrypted volume ID cannot be accurately read. Since at least one of the product mark and the volume ID as encryption-key generating information is recorded by the reflective film removal method, it is possible to prevent unauthorized use of content.

(2.4) Processing Example 2 of ID Writer

Figure 15:
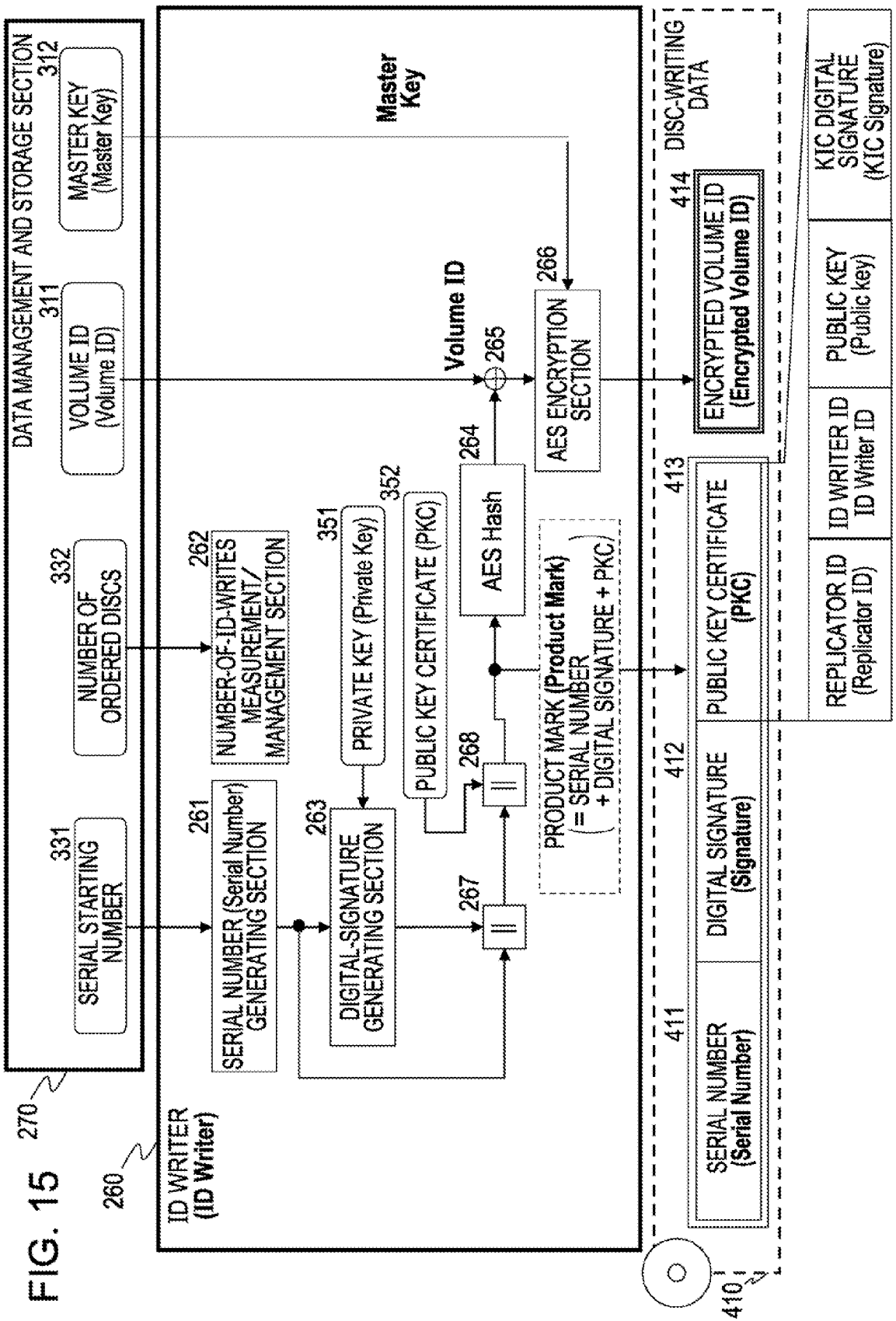
FIG. 15 is a diagram illustrating a processing example of an ID writer applied to disc manufacture according to an embodiment of the present invention.

Next, Processing Example 2 of the ID writer 260 will be described with reference to FIG. 15. The upper part of FIG. 15 shows data stored in the data management and storage section 270, the middle part shows processing in the ID writer 260, and the lower part shows disc-writing data 410. While in this example as well the description is directed to a processing example to which the master key 312 is applied, it is also possible to apply the master key hash value described above with reference to FIG. 10.

In Processing Example 1, only the public key certificate (PKC) 352 received from the information-recording-medium (disc) manufacture management entity (KIC) 104 is set as the product mark. In contrast, in Processing Example 2, data obtained by adding to this public key certificate (PKC) a serial number generated by the serial number generating section 261, and a digital signature generated by applying the private key 351 with respect to the serial number, that is, all of a serial number 411, a digital signature 412, and a public key certificate (PKC) 413 that are included in the disc-writing data 410 in FIG. 15 are set as the product mark. It should be noted that the expected effect of the invention is the same regardless of whether only the serial number 411, only the digital signature 412, or concatenated data of the serial number 411 and the digital signature 412 is set as the product mark.

A serial number and a digital signature are concatenated in a concatenating section 267 of the ID writer 260 shown in FIG. 15, and further concatenated with a public key certificate (PKC) in a concatenating section 268. These concatenated pieces of data are designated as the disc-writing data 410 as the product mark.

It should be noted that in the AES hash section 264, the hash value of the concatenated data of the serial number, the digital signature, and the public key certificate (PKC) is calculated, and a computation process between the calculated hash value and the volume ID 311, for example, an exclusive-OR operation (XOR) is executed in the computing section 265. The computation result is inputted to the AES encryption section 266, and an AES encryption process with the master key 312 stored in the data management and storage section 270 is executed to thereby generate an encrypted volume ID.

The encrypted volume ID generated by the AES encryption section 266 is written into a disc. This corresponds to an encrypted volume ID 414 in the disc-writing data 410 shown in the drawing. At least one of the product mark, that is, the concatenated data of the serial number 411, the digital signature 412, and the public key certificate (PKC) 413, and the encrypted volume ID 414 is written into each disc by the above-described reflective film removal method.

Even when pirated disc production through physical copying of a pit pattern from a legitimate commercial disc is executed on the basis of a disc having data that has been recorded by the reflective film removal method, as described above, data read from the reflective-film-removed portion of a legitimate disc and data read from a pirated disc are different from each other. Therefore, by setting a product mark and an encrypted volume ID as information for generating a key that is to be applied to decryption of content, it becomes impossible to perform decryption of content on the pirated disc.

(2.5) Processing Example 3 of ID Writer

Figure 16:
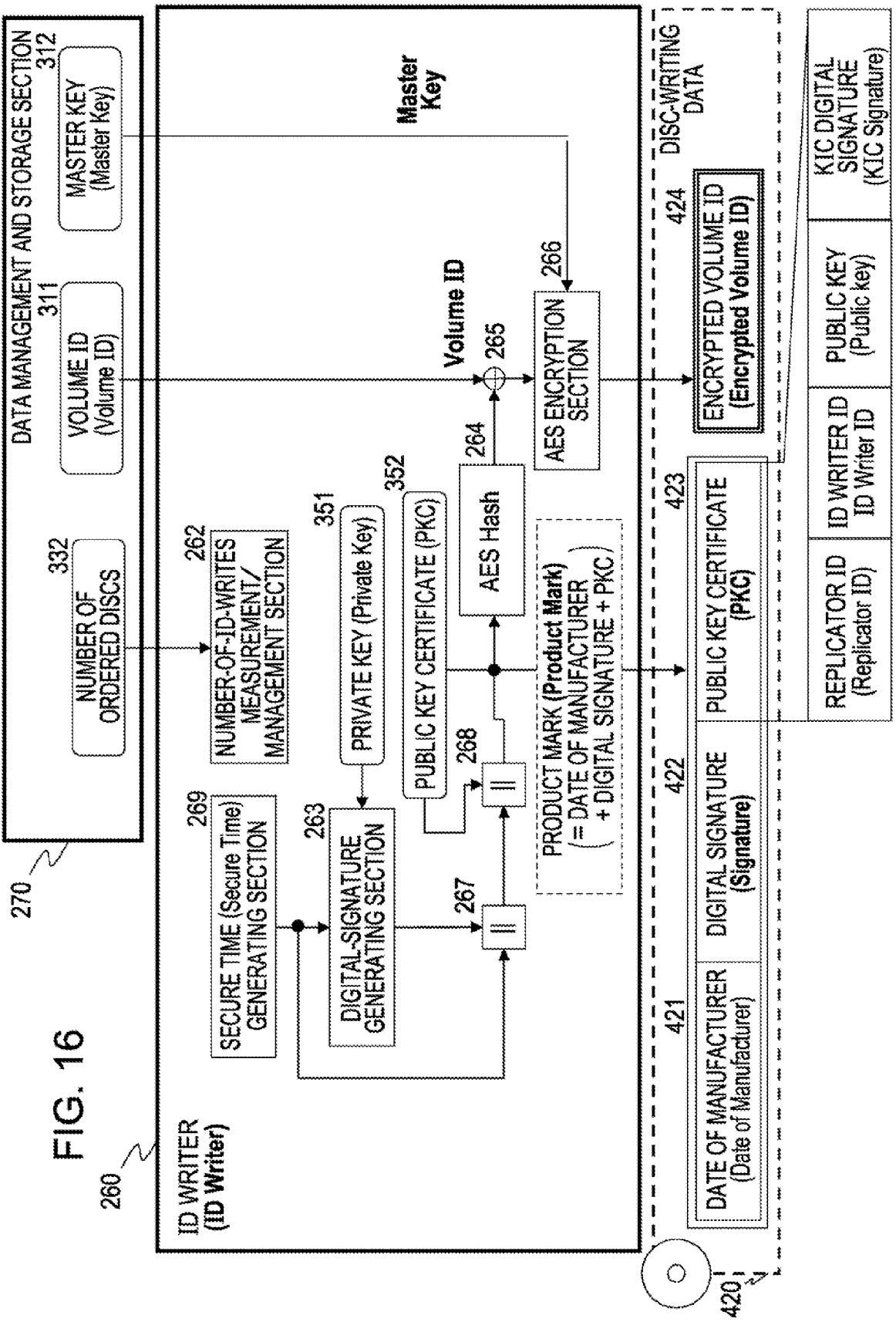
FIG. 16 is a diagram illustrating a processing example of an ID writer applied to disc manufacture according to an embodiment of the present invention.

Next, Processing Example 3 of the ID writer 260 will be described with reference to FIG. 16. The upper part of FIG. 16 shows data stored in the data management and storage section 270, the middle part shows processing in the ID writer 260, and the lower part shows disc-writing data 420. While in this example as well the description is directed to a processing example to which the master key 312 is applied, it is also possible to apply the master key hash value described with reference to FIG. 10.

In Processing Example 3, instead of a serial number, secure time is set as a component of a product mark. In a secure-time generating section 269, time information (date-of-manufacturer information) received from an institution that provides secure time information is acquired, or time information generated by time-information generating means placed under strict control is acquired. The digital signature generating section 263 generates a digital signature by applying the private key 351 managed by the information-recording-medium (disc) manufacture management entity (KIC) 104 with respect to the date-of-manufacturer information generated by the secure-time generating section 269. The subsequent processing is the same as that of Processing Example 2 described with reference to FIG. 15. It should be noted that the expected effect of the invention is the same regardless of whether only the date-of-manufacturer information 421, only the digital signature 421, or concatenated data of the date-of-manufacturer information 421 and the digital signature 422 is set as the product mark.

Secure time (date of manufacturer) and a digital signature are concatenated in the concatenating section 267 of the ID writer 260 shown in FIG. 16, and further concatenated with a public key certificate (PKC) in the concatenating section 268. These concatenated pieces of data are designated as the disc-writing data 420 as the product mark.

It should be noted that in the AES hash section 264, the hash value of the concatenated data of the secure time (date of manufacturer), the digital signature, and the public key certificate (PKC) is calculated, and a computation process between this calculated hash value and the volume ID 311, for example, an exclusive-OR operation (XOR) is executed in the computing section 265. The computation result is inputted to the AES encryption section 266, and an AES encryption process with the master key 312 stored in the data management and storage section 270 is executed to thereby generate an encrypted volume ID.

The encrypted volume ID generated by the AES encryption section 266 is written into a disc. This corresponds to an encrypted volume ID 424 in the disc-writing data 420 shown in the drawing. At least one of the product mark, that is, the concatenated data of the secure time (date of manufacturer) 421, the digital signature 421, and the public key certificate (PKC) 423, and the encrypted volume ID 424 is written into each disc by the above-described reflective film removal method.

Even when pirated disc production through physical copying of a pit pattern from a legitimate commercial disc is executed on the basis of a disc having data that has been recorded by the reflective film removal method, as described above, data read from the reflective-film-removed portion of a legitimate disc and data read from a pirated disc are different from each other. Therefore, by setting a product mark and an encrypted volume ID as information for generating a key that is to be applied to decryption of content, it becomes impossible to perform decryption of content on the pirated disc.

In the above-described example, the encrypted volume ID, and the product mark including at least a public key certificate (PKC) have been described as being separate pieces of data. However, these pieces of data may be combined and written into a disc by the reflective film removal method as a single piece of data.

Figure 17:
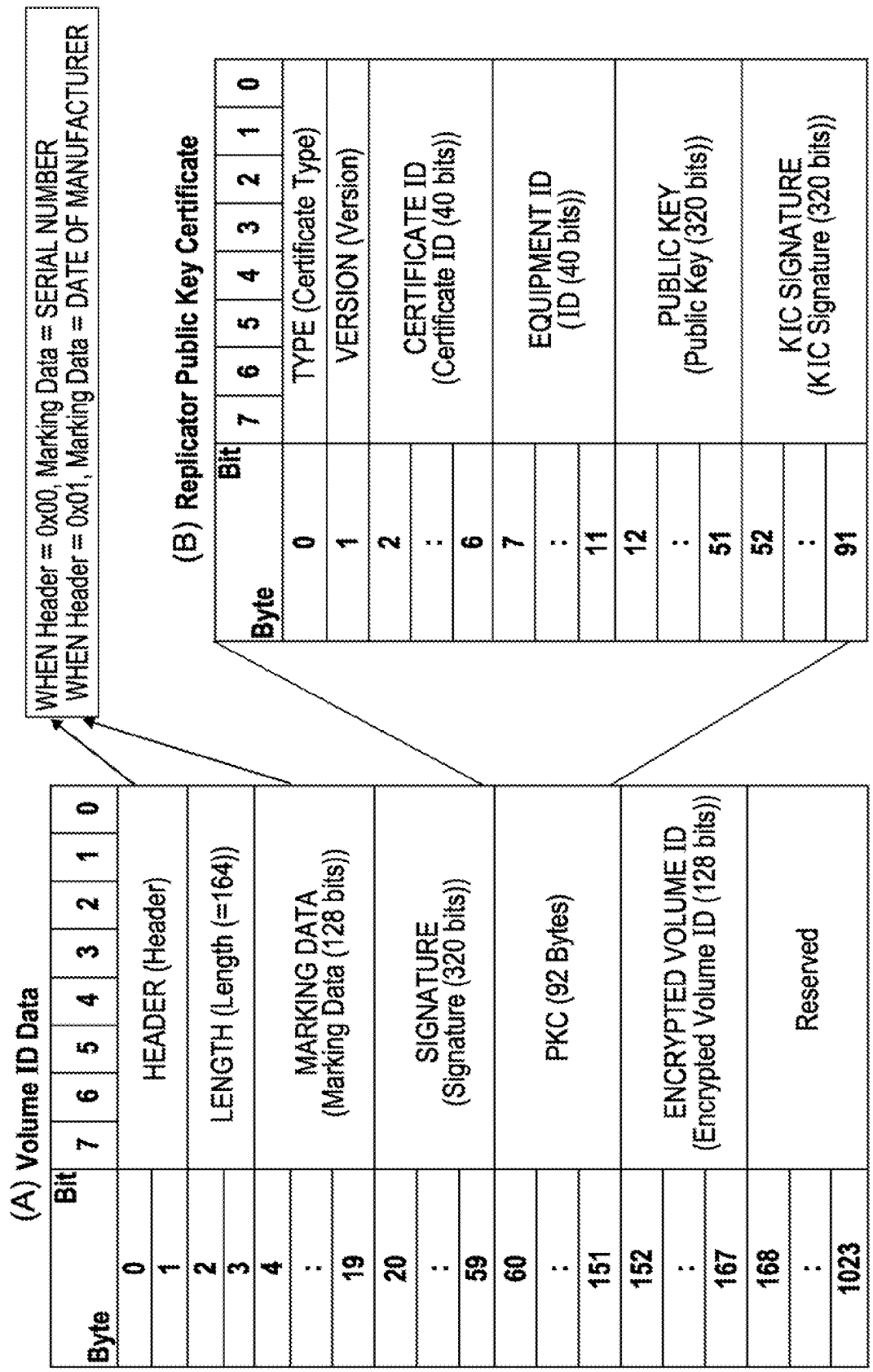
FIG. 17 is a diagram illustrating an example of a volume ID.

FIG. 17 shows an example of the data format of an encrypted volume ID including a product mark. FIG. 17(A) shows the data format of an encrypted volume ID including a product mark, and FIG. 17(B) shows an example of the data format of a public key certificate (PKC) included in the encrypted volume ID.

As shown in FIG. 17(A), an encrypted volume ID includes such pieces of data as a header, a length, marking data, a signature, a public key certificate (PKC), and an encrypted volume ID. Further, a public key certificate (PKC) includes such pieces of data as a type, a version, a certificate ID, an equipment (ID writer) ID, a public key, and a KIC signature.

The marking data in the encrypted volume ID shown in FIG. 17(A) is a storage area for either a serial number or date-of-manufacturer information. When the header=0x00, a serial number is stored, and when the header=0x01, data-of-manufacturer information is stored.

[3. Details of Generation and Reproduction Process for Disc-recording Data]

Figure 18:
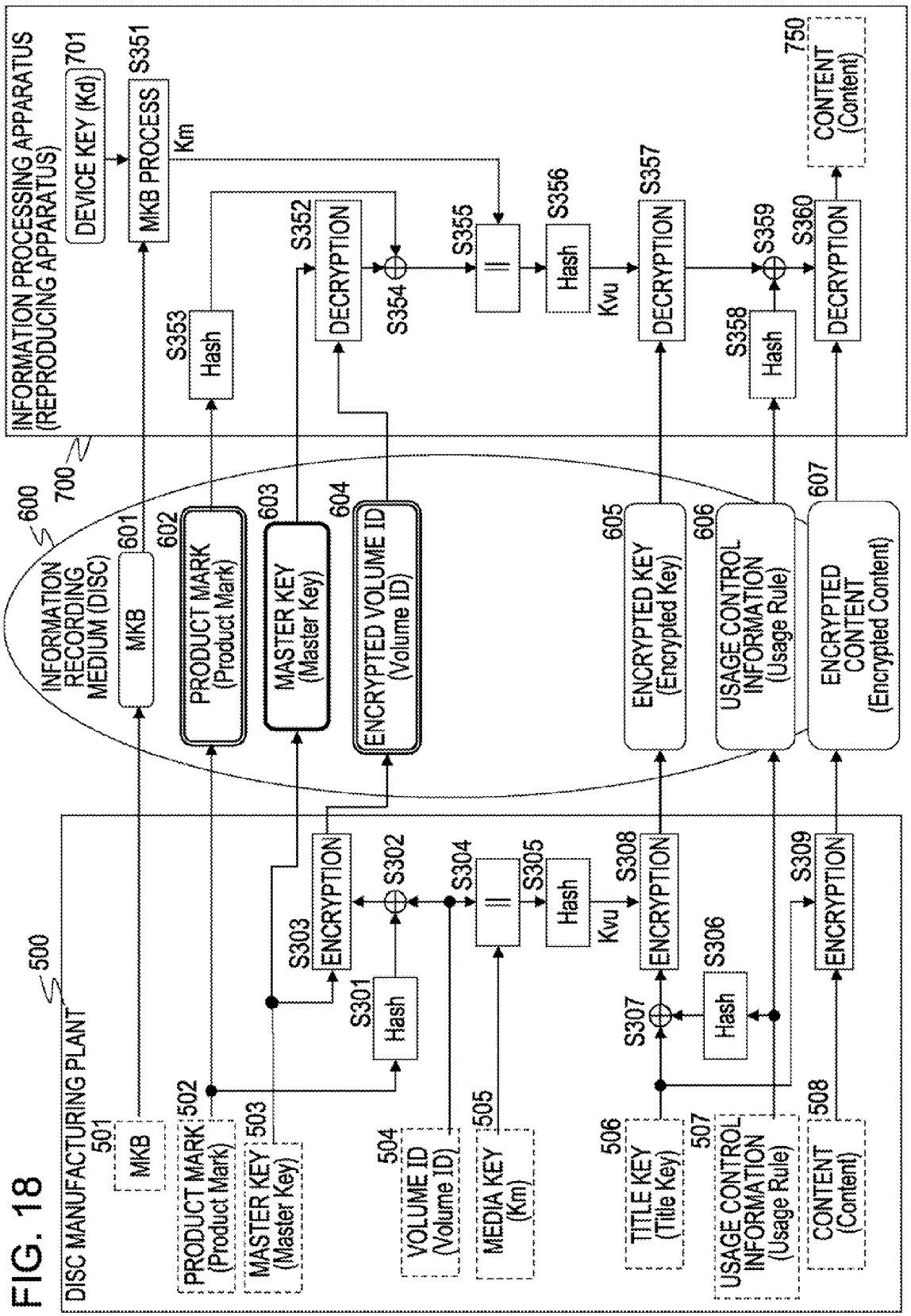
FIG. 18 is a diagram illustrating a data recording and reproduction process with respect to a disc according to an embodiment of the present invention.
Figure 19:
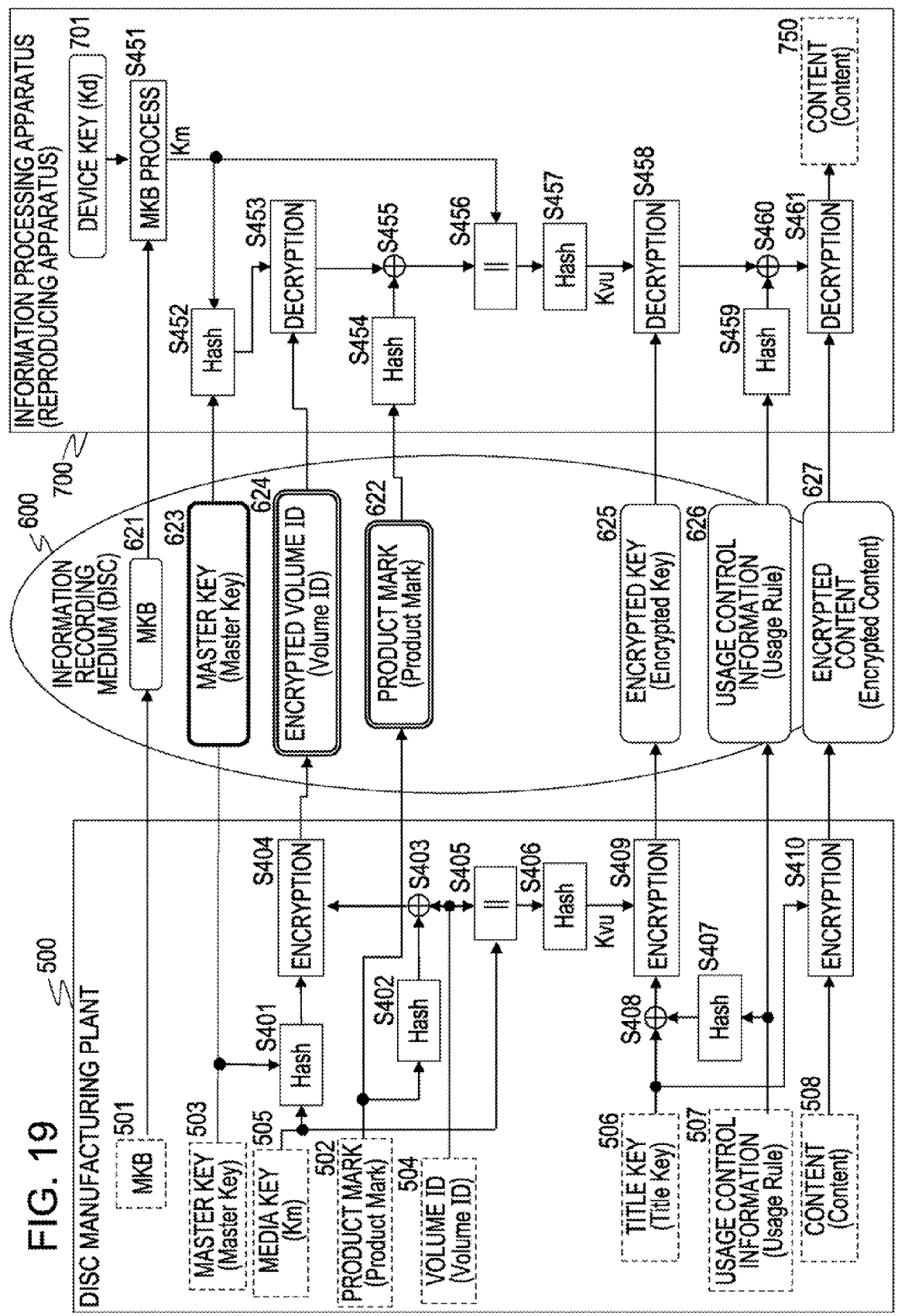
FIG. 19 is a diagram illustrating a data recording and reproduction process with respect to a disc according to an embodiment of the present invention.

Next, referring to FIGS. 18 and 19, details of the process for generating and reproducing disc-recording data will be described. FIG. 18 shows an example in which a master key is applied as an encryption key for an encrypted volume ID, and FIG. 19 shows an example in which a master key hash value is applied as an encryption key for an encrypted volume ID. That is, an example corresponding to the processing configuration in FIG. 9 with respect to the formatter 230 described above is shown in FIG. 18, and an example corresponding to the processing configuration in FIG. 10 is shown in FIG. 19.

First, the processing example of FIG. 18 to which a master key is applied as an encryption key for an encrypted volume ID will be described. FIG. 18 shows processing at a disc manufacturing plant 500, data stored in an information recording medium (disc) 600, and an information processing apparatus (reproducing apparatus) 700 as a user device that uses content stored in the information recording medium (disc) 600.

It should be noted that in the processing at the disc manufacturing plant 500 shown in FIG. 18, generation and recording of a product mark, and decryption and recording of a volume ID are executed by the ID writer 260 shown in FIG. 7, and generation of a master key, generation of a volume ID, encryption of content, and generation of these pieces of recording data, are executed by the formatter 230.

Respective pieces of data used at the disc manufacturing plant, from an MKB 501 to a content 508, will be described in order.

As described above, the MKB 501 is an encryption key block received from the licensing entity 103 shown in FIG. 7, and allows a media key (Km) to be extracted by processing with a device key (Kd) 701 stored in a memory of the information processing apparatus (reproducing apparatus) 700 shown in FIG. 18. The MKB501 is stored in the information recording medium (disc) 600. This corresponds to an MKB 601 shown in the drawing.

As described above with reference to FIGS. 12 to 17, a product mark 502 is data constituted by either:

(a) a public key certificate;

(b) a serial number, a digital signature, and a public key certificate; or (c) a date of manufacturer, a digital signature, and a public key certificate, and is generated by the ID writer 260 shown in FIG. 7. The product mark 502 is stored in the information recording medium (disc) 600. This corresponds to a product mark 602. It should be noted that, although not shown, the effect of the invention is the same irrespective of whether only a serial number, only a digital signature, or a combination of serial number and digital signature is set as the object of the product mark in (b) above. Further, the effect of the present invention is the same irrespective of whether only a date of manufacturer, only a digital signature, or a combination of date of manufacturer and digital signature is set as the object of the product mark in (c) above.

Of the pieces of data to be recorded onto the information recording medium (disc) 600, at least one of the product mark 602 and an encrypted volume ID 604 is recorded in accordance with the reflective film removal method described above.

As described above with reference to FIGS. 9 and 10, the master key 503 is data generated by the formatter 230 shown in FIG. 7. The master key 503 is stored onto the information recording medium (disc) 600. This corresponds to a master key 603. The master key 603 is recorded as data that can be read only by a special data reproduction method such as a side-channel method or ROM-mark method.

As described above with reference to FIGS. 9, 10, a volume ID 504 is data generated by the formatter 230 shown in FIG. 7. The volume ID 504 is subjected to computation, for example, an exclusive-OR operation in step S302 with the hash value of the product mark generated in step S301. An encryption process with the master key 503 is executed in step S303 with respect to the computation result, and the resultant data is stored onto the information recording medium 600 as the encrypted volume ID 604. This is the processing of the ID writer 260 described above with reference to FIGS. 12 to 17.

As described above, at least one of the product mark and the encrypted volume ID 604 is recorded in accordance with the above-described reflective film removal method.

A media key 505 is key data received from the licensing entity 103 shown in FIG. 7. The media key 505 is concatenated with the volume ID 504 in step S304, and the hash value of the concatenated data is calculated in step S305 and applied to generation of a volume-unique key (Kvu). The media key 505 is not stored in the information recording medium (disc) 600. It should be noted, however, that the media key 505 is a key stored in the MKB 501, and the media key (Km) can be extracted through processing using a device key (Kd) 701 that is stored in a memory of a user device with a legitimate license, that is, an information processing apparatus (reproducing apparatus) 700 shown in FIG. 18.

A title key 506 is key data that is applied to the encryption (S309) of the content 508 generated by the formatter 230 shown in FIG. 7.

Usage control information (Usage Rule) 507 is data that is received together with authored content from the content authoring entity 102 shown in FIG. 7.

In step S306, the hash value of the usage control information (Usage Rule) 507 is calculated, and in step S307, an exclusive-OR (XOR) of the title key 506 and the hash value is calculated. In step S308, the computation result is encrypted with the volume-unique key (Kvu) generated on the basis of the volume ID and the media key (Km) 505, and is stored as an encrypted key 605 onto the information recording medium (disc) 600.

The content is the authored content received from the content authoring entity 102 shown in FIG. 7. The content is subjected to an encryption process with the title key 506 in step S309, and stored as an encrypted content 607 onto the information recording medium (disc) 600.

As a result, as shown in the drawing, the information recording medium (disc) 600 stores the following pieces of data:

the MKB 601 as an encryption key block storing a media key (Km);

the product mark 602 constituted by either (a) a public key certificate, (b) a serial number, a digital signature, and a public key certificate, or (c) a date of manufacturer, a digital signature, and a public key certificate;

the master key 603;

the encrypted volume ID 604;

the encrypted key 605;

the usage control information 606; and the encrypted content 607.

Of these pieces of data, the master key 603 is written in a data format that can be read only by a data reading method different from that used for standard data reading such as content reading, such as a side-channel method or ROM mark recording method. Further, at least one of the product mark 602 and the encrypted volume ID 604 is written by the above-described reflective film removal method. Further, the encrypted volume data 604 is data that differs for every ID writer 260, and the product mark 602 is also set as data that differs for every single disc if the product mark 602 is one constituted by a serial number, a digital signature, and a public key certificate or by a date of manufacturer, a digital signature, and a public key certificate.

The information recording medium 600 in which these pieces of data are recorded is loaded into the information processing apparatus (reproducing apparatus) 700 as a user device, and by executing a predetermined data reproducing application, a preset processing sequence is executed to perform content reproduction. The processing of the information processing apparatus (reproducing apparatus) 700 that executes reading and reproduction of data and content stored in the information recording medium (disc) 600 will now be described.

First, in step S351, the information processing apparatus (reproducing apparatus) 700 acquires a media key (Km) by executing the processing of the MKB 601 read from the information recording medium 600 with the device key (kd) 701 stored in the memory of the information processing apparatus (reproducing apparatus) 700. It should be noted that to acquire a media key (Km) from the MKB 601, it is necessary to apply a device key (Kd) that is stored in an information processing apparatus with a valid license. A revoked user device is disabled from acquiring a media key (Km).

Next, in step S352, the encrypted volume ID 604 read from the information recording medium 600 is decrypted with the master key 603 read from the information recording medium 600, and a volume ID is calculated. Then, in step S353, the hash value of the product mark 602 read from the information recording medium 600 is calculated, and in step S354, computation between this and the volume ID (exclusive-OR) is executed. Further, in step S355, the resultant data is concatenated with the media key (Km) acquired by the MKB processing, and the hash value of the concatenated data is calculated in step S356.

As a result, a volume-unique key (Kvu) is generated. The processing of steps S352 to S356 is the same as that of steps S301 to S305 at the disc manufacturing plant, and a volume-unique key (Kvu) is generated as a result.

Next, in step S357, the encrypted key 605 read from the information recording medium 600 is decrypted with the volume-unique key (Kvu), and in step S358, the hash value of the usage control information 606 read from the information recording medium 600 is calculated. In step S359, a computation (exclusive-OR) between this and the decryption result obtained in step S357 is executed, thereby calculating a title key.

The processing of steps S357 to S359 corresponds to that of steps S306 to S308 at the disc manufacturing plant, and a title key is generated as a result.

Next, in step S360, using the generated title key, decryption of the encrypted content 607 read from the information recording medium 600 is executed to thereby generate and output content 750.

As described above, to perform decryption of encrypted content stored in the information recording medium 600, in addition to acquiring a media key (Km) from the MKB, it is required to accurately read data recorded by a special data recording method, such as the product mark 602, the master key 603, and the encrypted volume ID 604 stored in the information recording medium 600. The product mark 602 or the encrypted volume ID 604 recorded by the reflective film removal method cannot be accurately read from a pirated disc generated by executing physical copying of a pit pattern, thus disabling content decryption.

Next, referring to FIG. 19, description will be given of an example of configuration to which a master key hash value is applied as an encryption key for an encrypted volume.

The master key 503 is the master key 503 generated by the formatter 230 shown in FIG. 7. In step S401, the hash value of the master key 503 is calculated by using the media key 505, and in step S404, by using the master key hash value, decryption with respect to the concatenated data of the volume ID 504 and the product mark 502 is executed, and the resultant data is recorded as an encrypted volume ID 624.

Otherwise, the processing at the disc manufacturing plant is the same as that described above with reference to FIG. 18, and description thereof is omitted.

In the processing example shown in FIG. 19 as well, as shown in the drawing, the information recording medium (disc) 600 stores the following pieces of data:

an MKB 621 as an encryption key block storing a media key (Km);
a product mark 622 constituted by either
(a) a public key certificate,
(b) a serial number, a digital signature, and a public key certificate, or
(c) a date of manufacturer, a digital signature, and a public key certificate;
a master key 623;
the encrypted volume ID 624;
an encrypted key 625;
usage control information 626; and
encrypted content 627.

Of these pieces of data, the master key 623 is written in a data format that can be read only by a data reading method different from that used for ordinary data reading such as content reading, such as a side-channel method or ROM mark recording method. Further, at least one of the product mark 622 and the encrypted volume ID 624 is written by the above-described reflective film removal method. Further, the encrypted volume data 624 is data that differs for every single disc, and the product mark 622 is also set as data that differs for every single disc if the product mark 622 is one constituted by a serial number, a digital signature, and a public key certificate or by a date of manufacturer, a digital signature, and a public key certificate.

The information recording medium 600 in which these pieces of data are recorded is loaded into the information processing apparatus (reproducing apparatus) 700 as a user device, and by executing a predetermined data reproducing application, a preset processing sequence is executed to perform content reproduction. The processing of the information processing apparatus (reproducing apparatus) 700 that executes reading and reproduction of data and content stored in the information recording medium (disc) 600 will now be described, mainly focusing on the difference from the processing shown in FIG. 18.

The processing of the information processing apparatus (reproducing apparatus) 700 differs from the processing shown in FIG. 18 in that in step S452, with respect to the master key 623 read from the information recording medium 600, a hash value is calculated by using a media key (Km) acquired from the MKB 621, and in step S453, the master key hash value is used to execute decryption of the encrypted volume ID 624 read from the information recording medium 600 to thereby calculate a volume ID. Otherwise, the processing is the same as that described above with reference to FIG. 18, and description thereof is omitted.

In this processing example as well, to perform decryption of encrypted content stored in the information recording medium 600, in addition to acquiring a media key (Km) from the MKB, it is required to accurately read data recorded by a special data recording method, such as the product mark 622, the master key 623, and the encrypted volume ID 624 stored in the information recording medium 600. The product mark 622 or the encrypted volume ID 624 recorded by the reflective film removal method cannot be accurately read from a pirated disc generated by executing physical copying of a pit pattern, thus disabling content decryption.

Figure 20:
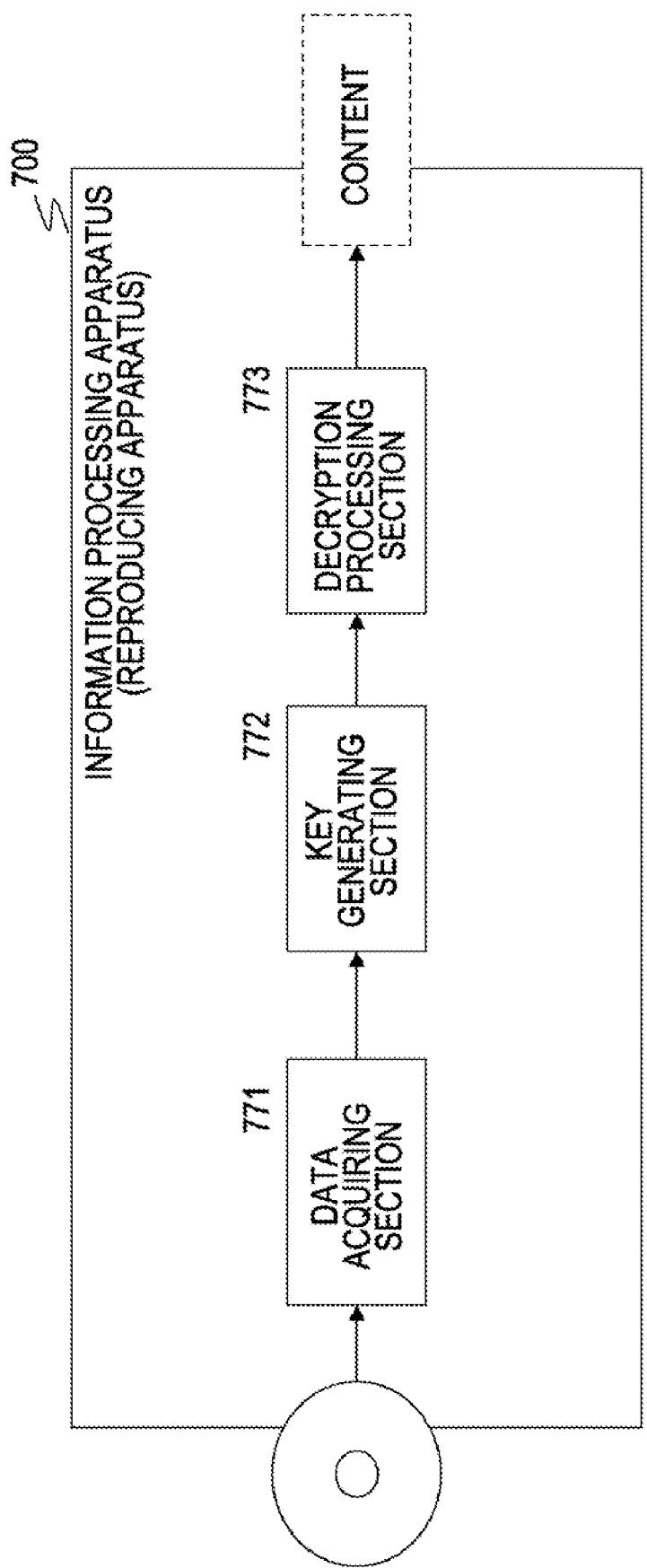
FIG. 20 is a diagram illustrating an example of configuration of an information processing apparatus that executes a reproduction process.

Referring to FIG. 20, description will be given of the configuration of the information processing apparatus (reproducing apparatus) 700 as a user device. The information processing apparatus (reproducing apparatus) 700 executes data reading and content reproduction from an information recording medium in which encrypted content is recorded.

The information processing apparatus (reproducing apparatus) 700 includes a data acquiring section 771 that executes reading of data from an information recording medium, a key generating section 772 that generates a key used for content decryption by executing data processing based on data acquired from the data acquiring section 771, and a decryption processing section 773 that executes decryption of encrypted content on the basis of the key generated by the key generating section 772. As described above with reference to FIGS. 18 and 19, the key generating section 771 receives from the data acquiring section 771 an input of key generating information, which includes a product mark containing a public key certificate issued with respect to a disc manufacturing entity or to equipment applied to disc manufacture, and an encrypted volume ID as data obtained by performing encryption on a result of computation based on a product-mark-associated value such as a hash value generated on the basis of the product mark and a volume ID as an identifier set with respect to a given set of discs to be manufactured. Data processing is executed by applying these pieces of key generating information, thereby generating a key used for content decryption, that is, a title key.

[4. Disc Verification Process]

Figure 21:
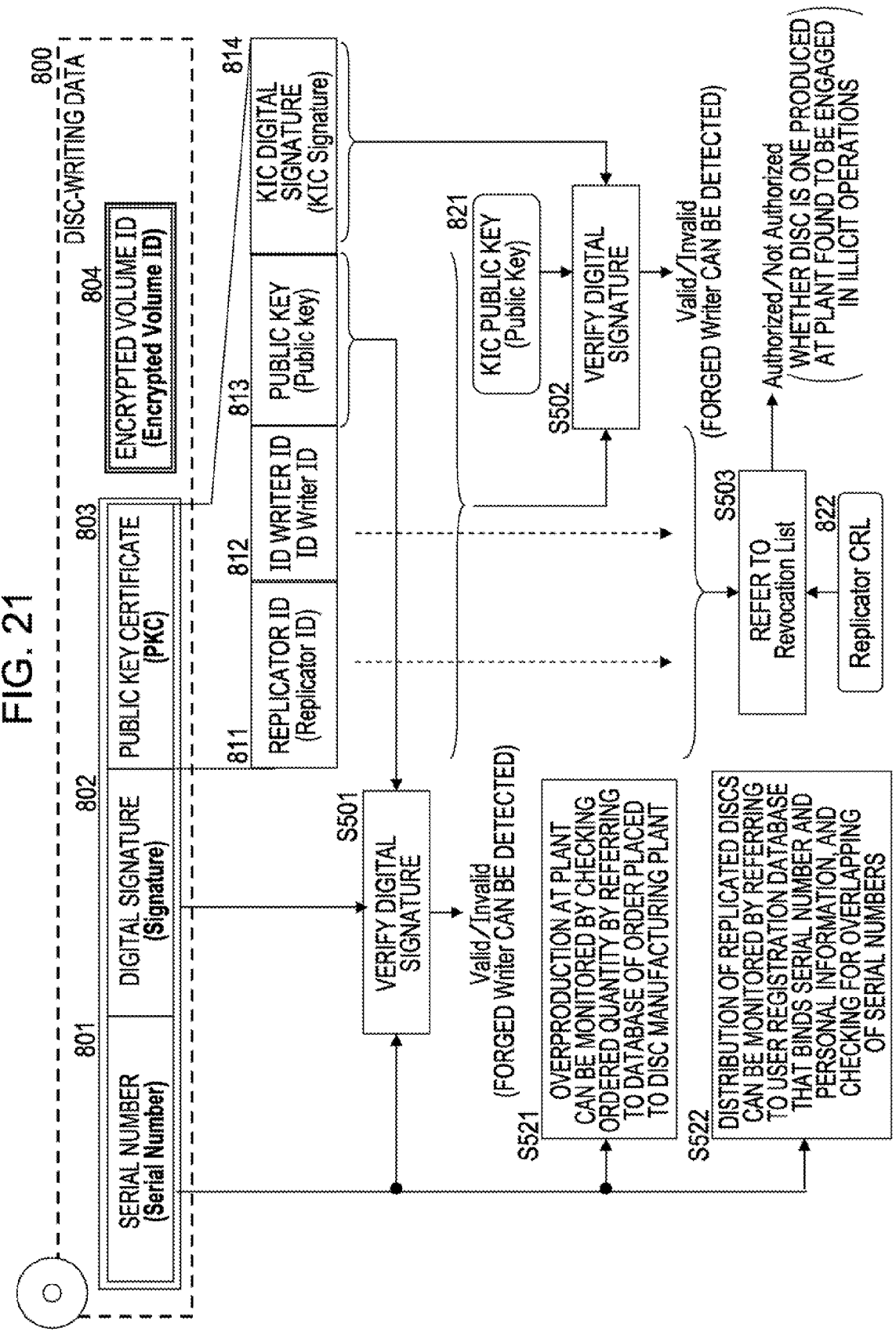
FIG. 21 is a diagram illustrating an example of a disc analyzing process.
Figure 22:
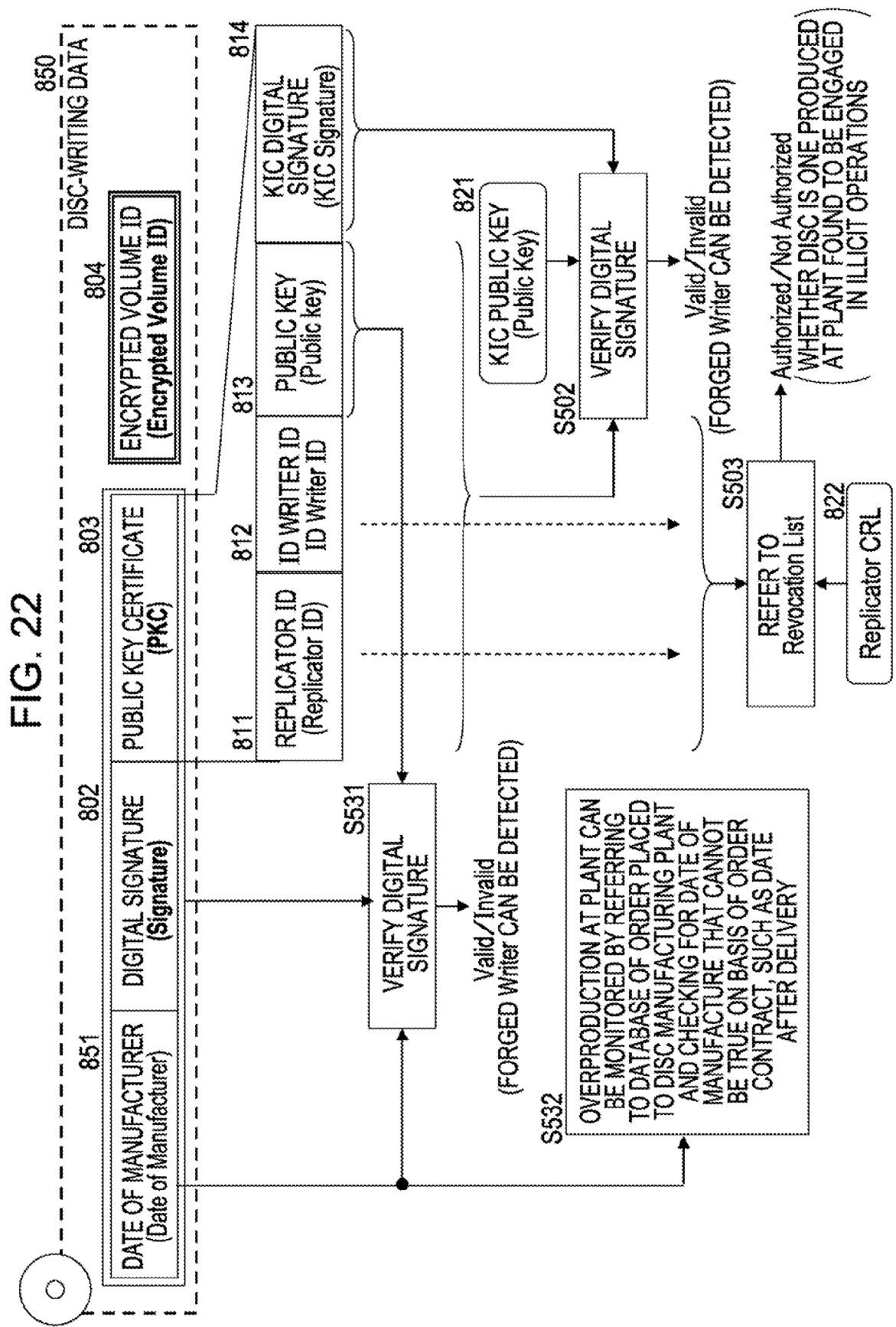
FIG. 22 is a diagram illustrating an example of a disc analyzing process.

Next, referring to FIGS. 21 and 22, description will be given of a process of identifying a pirated disc and tracking down its source through verification of discs circulating in the market. FIG. 21 shows a verification/tracking example in which a serial number is written into each disc, and FIG. 22 shows a verification/tracking example in which date-of-manufacturer information is written into each disc.

First, referring to FIG. 21, description will be given of a verification/tracking example in which a serial number is written into each disc.

A serial number 801, a digital signature 802, a public key certificate (PKC) 803, and an encrypted volume ID 804 are shown at the top of FIG. 21 as disc-writing data 800. It is assumed that the serial number 801, the digital signature 802, and the public key certificate 803 (PKC) are constituent data of a product mark, and the product mark and the encrypted volume ID 804 are recorded by the reflective film removal method.

A replicator ID 811, an ID writer ID 812, a public key 813, and a KIC digital signature 814 are recorded in the public key certificate (PKC) 803.

First, when performing verification of a disc in the market, in step S501, the public key 813 is acquired from the public key certificate (PKC) 803 that is a component of a product mark, and the digital signature 802 that is a component of the product mark is read, and a signature verification process is carried out. Tampering verification for the serial number 801 can be performed through this signature verification process.

If tempering with the serial number 801 is found, this means circulation of a pirated disc in the market by use of a misappropriated ID writer. That is, circulation of a pirated disc can be detected through tampering verification for the serial number 801.

Likewise, signature verification with respect to the KIC digital signature 814 stored in the public key certificate (PKC) 803 is executed with a KIC public key 821, and it is verified whether or not the public key certificate (PKC) 803 has been tempered with. If it is determined that tampering has been done, it can be determined that a pirated disc produced by use of a misappropriated ID writer is circulating in the market.

Further, when signature verification with respect to the KIC digital signature 814 stored in the public key certificate (PKC) 803 is executed with the KIC public key 821, and it is determined that the public key certificate (PKC) 803 has not been tampered with, in step S503, a revocation status determination is made by using a revocation list (CRL) 822 listing equipment registered as being unauthorized, thereby making it possible to determine whether or not the equipment being verified is a replicator as disc manufacturing equipment or a revoked ID writer.

Further, in step S521, the quantity of an order is checked by referring to a database of orders placed to disc manufacturing plants, thus enabling verification of overproduction at a plant. If overproduction is found, the replicator ID 811 and the ID writer ID 812 recorded in the public key certificate (PKC) 803 are identified, so equipment corresponding to these IDs can be determined as being involved in the overproduction. Further, in step S522, by referring to a user registration database in which serial numbers and personal information are bound, it is possible to verify circulation of a replicated disc by checking for overlapping of serial numbers.

FIG. 22 shows a verification/tracking example in which date-of-manufacturer information is written into each disc. A date of manufacturer 851, the digital signature 802, the public key certificate (PKC) 803, and the encrypted volume ID 804 are shown at the top of FIG. 22 as disc-writing data 850. It is assumed that the date of manufacturer 851, the digital signature 802, and the public key certificate 803 (PKC) are constituent data of a product mark, and the product mark and the encrypted volume ID 804 are recorded by the reflective film removal method.

In the processing of step S531, the public key 813 is acquired from the public key certificate (PKC) 803 that is a component of a product mark, and the digital signature 802 that is a component of the product mark is read, thereby carrying out a signature verification process. Tampering verification for the date of manufacturer 850 can be carried out through this signature verification process.

If tempering with the date of manufacturer 851 is found, this means circulation of a pirated disc in the market by use of a misappropriated ID writer. That is, circulation of a pirated disc can be detected through tampering verification for the serial number 801. Since the processing of steps S502 and S503 is the same as that described above with reference to FIG. 21, description thereof is omitted.

According to the processing of step S532, overproduction at a plant is verified by checking for a date of manufacturer that cannot be true on the basis of an order contract, such as a date after the actual delivery, by referring to a database of orders placed to disc manufacturing plants. If overproduction is found, the replicator ID 811 and the ID writer ID 812 recorded in the public key certificate (PKC) 803 are identified, so equipment corresponding to these IDs can be determined as being involved in the overproduction.

As described above, the present invention is configured so that a product mark constituted by either:

(a) a public key certificate;

(b) a serial number, a digital signature, and a public key certificate; or (c) a date of manufacturer, a digital signature, and a public key certificate, and an encrypted volume ID, which is generated by encryption using a master key or a master key hash value of concatenated data containing, for example, a hash value based on the above-mentioned product mark and a volume ID, are recorded onto the information recording medium. At least one of the product mark and the encrypted volume ID is recorded by the reflective film removing method. This configuration makes generation of a pirate version difficult, and enables detection of the circulation of a pirated disc in the market. Further, should a pirated disc has been circulated into the market, the related manufacturing equipment can be identified. It should be noted that although not shown, the effect of the invention is the same irrespective of whether only a serial number, only a digital signature, or a combination of serial number and digital signature is set as the object of the product mark in (b) above. Likewise, the effect of the invention is the same irrespective of whether only a date of manufacturer, only a digital signature, or a combination of date of manufacturer and digital signature is set as the object of the product mark in (c) above.

[5. Configuration of Information Processing Apparatus]

Next, referring to FIG. 23, description will be given of an example of the hardware configuration of an information processing apparatus as a data recording apparatus corresponding to an ID writer that executes generation of data to be recorded onto an information recording medium (disc), and of an information processing apparatus as a data reproducing apparatus that executes reproduction of data from an information recording medium (disc).

An information processing apparatus 900 includes a CPU 901 that executes data processing according to various programs, such as a program for executing data recording or content reproduction or an encryption-key generation processing program, a ROM 902 serving as a storage area for storing programs and parameters, a memory 903, an input/output I/F 904 for inputting/outputting signals, and encryption processing means 905 for executing various kinds of encryption process such as encryption-key generation and encryption and decryption of content. The above-described blocks are each connected to a bus 910.

A data recording section 906 is a component of a data recording apparatus as an ID writer, and is configured so as to allow data recording based on the reflective film removing method. A recording medium I/F 907 is a component of an information processing apparatus that executes data reproduction, and executes reading of data from a disc storing encrypted content or other such data.

Private information such as a master key, a volume ID, a serial staring number, and the number of ordered discs, are inputted to a data recording apparatus as an ID writer via the input/output I/F 904. In addition to these pieces of data, a public key certificate, and a private key are stored in the ROM 902 or the memory 903. In the case of an information processing apparatus that executes a reproduction process, a device key or the like is stored in the ROM 902 or the memory 903. The encryption process, decryption process, and key generation process are executed by the encryption processing means 907 through the application of, for example, an AES algorithm.

Figure 23:
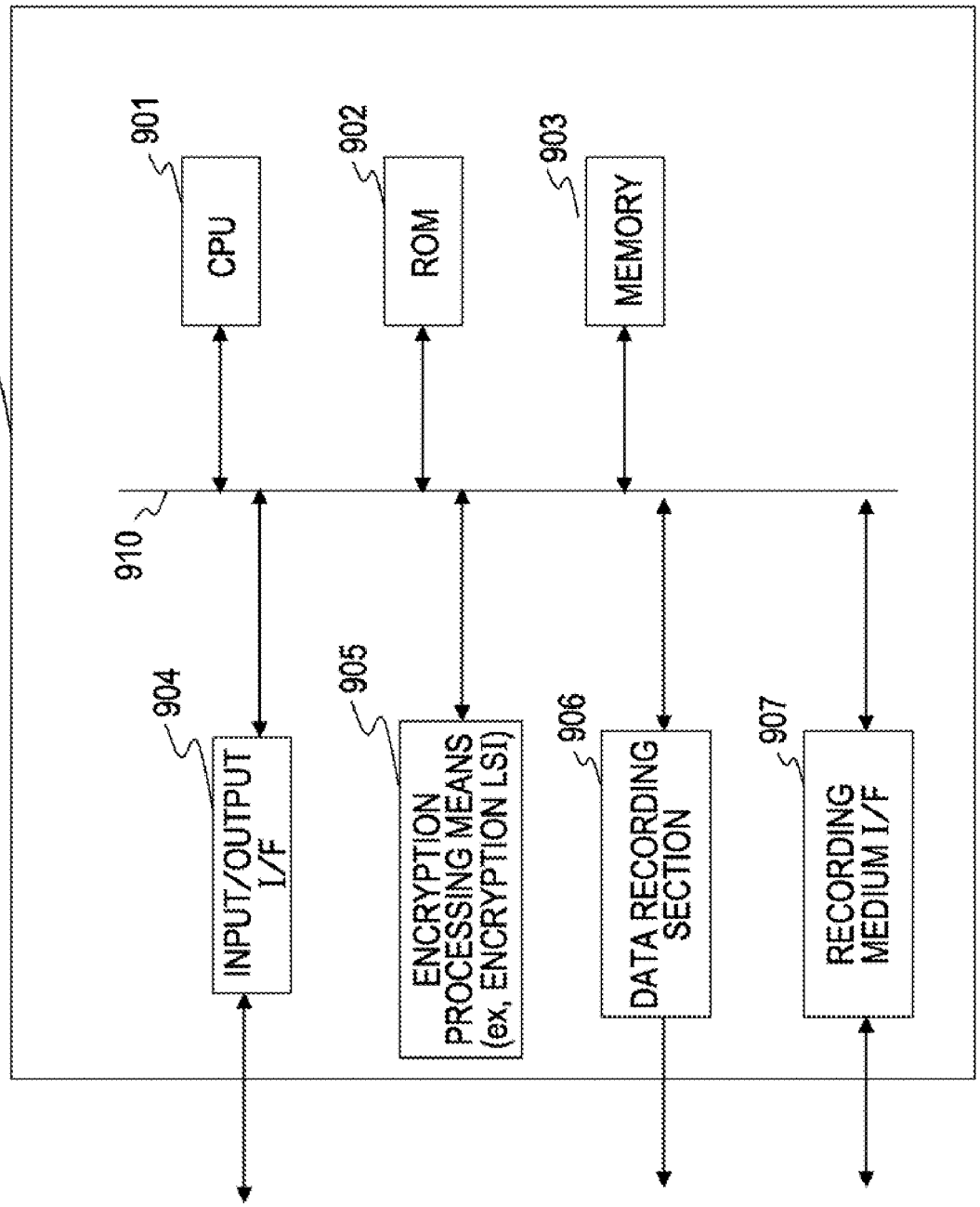
FIG. 23 is a diagram illustrating an example of configuration of a data recording apparatus that executes a data recording process with respect to a disc, and of an information processing apparatus that executes a reproduction process.

It should be noted that the components shown in FIG. 23 are those required for carrying out the processing according to the present invention, and component elements other than those related to the processing according to the present invention are omitted. For example, in the case of an information processing apparatus that executes content reproduction, in addition to the components shown in FIG. 23, the information processing apparatus includes such components as an interface for inputting/outputting analog signals, an A/D or D/A converter, an MPEG codec for executing encoding and decoding of MPEG data, and TS/PS processing means for executing TS (Transport Stream)/PS (Program Stream) processing.

The present invention has been described above in detail with reference to its specific embodiments. However, it is obvious that modifications and alternatives of the embodiments may be made by those skilled in the art without departing from the scope of the present invention. That is, the above disclosure of the present invention is only exemplary, and should not be construed restrictively. The scope of the present invention is to be determined by reference to the claims appended hereto.

The series of processes described in this specification can be executed by hardware, software, or a combination of hardware and software. When the processes are to be executed by software, they can be executed by installing a program recording a processing sequence into a memory of a computer embedded in dedicated hardware, or by installing a program into a general-purpose computer capable of executing various processes.

For example, the program can be recorded onto a hard disk or ROM (Read Only Memory) as a recording medium in advance. Alternatively, the program can be temporarily or permanently stored (recorded) onto a removable recording medium such as a flexible disc, a CD-ROM (Compact Disc Read Only Memory), a MO (Magneto optical) disc, a DVD (Digital Versatile Disc), a magnetic disc, or a semiconductor memory. Such a removable medium can be offered in the form of so-called package software.

The program may be installed onto a computer from the removable recording medium described above. Further, the program may be transferred onto a computer in a wireless fashion from a download site. Alternatively, the program may be transferred onto a computer in a wired fashion via a network such as a LAN (Local Area Network) or the Internet. The computer receives the program thus transferred and install the program onto a recording medium such as a built-in hard disk.

The various processes described in this specification may be performed not only time sequentially in the order as stated, but may also be executed in parallel or individually as needed or in accordance with the throughput capacity of an apparatus that executes the processes. Further, the term system as used in this specification refers to a logical assembly of a plurality of devices, without regard to whether or not the respective devices are accommodated in the same housing.

INDUSTRIAL APPLICABILITY

As has been described above, in the configuration according to the present invention, a product mark containing a public key certificate issued with respect to a disc manufacturing entity or disc manufacturing equipment, and an encrypted volume ID calculated by a computation based on a product-mark-associated value, such as a hash value generated on the basis of the product mark, and a volume ID as an identifier set with respect to a given set of discs to be manufactured, are generated. The product mark and the encrypted volume ID thus generated are recorded onto each disc as key generating information for generating a key used for decryption of encrypted content stored on the disc. Further, at least one of the product mark and the encrypted volume ID is recorded by the reflective film removing method. Therefore, the product mark or the encrypted volume ID as key generating information cannot be read from a pirated disc produced on the basis of a legitimate commercial disc by physically copying a pit pattern, thereby making it possible to prevent unauthorized reproduction or use of content.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

Further, in the configuration according to the present invention, the public key certificate including identification information for an information-recording-medium manufacturing entity or information-recording-medium manufacturing equipment is included in the product mark. Therefore, with regard to a pirated disc generated by means other than physical copying of a pit pattern, for example on the basis of RF signal read data, an information-recording-medium manufacturing entity or information-recording-medium manufacturing equipment involved in the manufacture of the pirated disc can be tracked down and identified by acquiring a public key certificate from the disc.

The invention claimed is:

1. A method of manufacturing a disc configured to store encrypted content, the method comprising:
   (a) generating a product mark which is used to generate a key applied to decryption of the encrypted content, the product mark:
      (i) including a public key certificate corresponding to a disc manufacturing entity or disc manufacturing equipment; and
      (ii) containing identification information for a disc manufacturing entity or disc manufacturing equipment;
   (b) using the generated product mark, generating a product-mark-associated value;
   (c) using the generated product-mark-associated value and a volume identifier, generating a computation result, the volume identifier being set with respect to a given set of discs to be manufactured;
   (d) generating an encrypted volume identifier by encrypting the computation result, the encryption volume identifier being used to generate said key applied to decryption of the encrypted content; and
   (e) recording the product mark and the encrypted volume identifier onto each individual disc, at least one of the product mark and the encrypted volume identifier being recorded by a reflective-film-removal recording method that selectively etches a reflective film from lands that have been previously formed on each individual disc, wherein the reflective-film-removal recording method causes the lands with the etched reflective film to be interpreted as values of '0' by a data reading information process apparatus and interpreted as values of '1' by a transfer device that physically copies discs.

2. The method of claim 1, wherein the product mark includes:
   (a) a serial number set for each disc to be manufactured; and
   (b) a digital signature data set in correspondence to the serial number.

3. The method of claim 1, wherein the product mark includes:
   (a) date-of-manufacturer information for a disc to be manufactured; and
   (b) digital signature data set in correspondence to the date-of-manufacturer information.

4. The method of claim 1, wherein the product-mark-associated value includes a hash value.

5. The method of claim 1, which includes generating the encrypted volume identifier by encrypting the computation result using a master key set with respect to a given set of discs to be manufactured or using a hash value of the master key.

6. The method of claim 5, which includes recording the master key by applying a modulation process different from a recording mode of encrypted content recorded onto a disc.

7. The method of claim 1, wherein the product mark and the encrypted volume identifier are generated and recorded for each individual disc to be manufactured, without being set as information to be recorded onto a master or a stamper applied to disc manufacture.

8. A data recording apparatus which executes data recording with respect to an information recording medium, the data recording apparatus comprising: a processor; and a memory device storing instructions which when executed by the processor, causes the processor to:
   (a) generate a product mark which is used to generate a key applied to decryption of encrypted content recorded on the information recording medium, the product mark:
      (i) including a public key certificate corresponding to an information-recording-medium manufacturing entity or information-recording-medium manufacturing equipment: and
      (ii) containing identification information for an information-recording-medium manufacturing entity or information-recording-medium manufacturing equipment;
   (b) using the generated product mark, generate a product-mark-associated value;
   (c) using the generated product-mark-associated value and a volume identifier, generate a computation result, the volume identifier being set with respect to a given set of discs to be manufactured;
   (d) generate an encrypted volume identifier by encrypting the computation result, the encryption volume identifier being used to generate said key applied to decryption of encrypted content recorded on the information recording medium; and
   (e) record the product mark and the encrypted volume identifier onto each individual information recording medium, at least one of the product mark and the encrypted volume identifier being recorded by a reflective-film-removal recording method that selectively etches a reflective film from lands that have been previously formed on the individual information recording medium, wherein the reflective-film-removal recording method causes the lands with the etched reflective film to be interpreted as values of '0' by a data reading information process apparatus and interpreted as values of '1' by a transfer device that physically copies discs.

9. The data recording apparatus of claim 8, wherein the product mark includes:
   (a) a serial number set for each information recording medium to be manufactured; and
   (b) a digital signature data set in correspondence to the serial number.

10. The data recording apparatus of claim 8, wherein the product mark includes:
(a) date-of-manufacturer information for an information recording medium to be manufactured; and
(b) a digital signature data set in correspondence to the date-of-manufacturer information.

11. A non-transitory recording medium storing instructions structured to cause an information processing apparatus to:
(a) generate a product mark which includes:
(i) a public key certificate corresponding to an information-recording-medium manufacturing entity or information-recording-medium manufacturing equipment; and
(ii) identification information for an information-recording-medium manufacturing entity or information-recording-medium manufacturing equipment, the product mark serving as information for generating a key applied to decryption of encrypted content;
(b) using the generated product mark, generate a product-mark-associated value;
(c) using the generated product-mark-associated value and a volume identifier, generate a computation result, the volume identifier being set with respect to a given set of discs to be manufactured;
(d) generate an encrypted volume identifier by encrypting the computation result, the encryption volume identifier being used to generate the key applied to decryption of encrypted content recorded on the information recording medium; and
(e) record at least one of the product mark and the encrypted volume identifier by a reflective-film-removal recording method that selectively etches a reflective film from lands that have been previously formed on the individual information recording medium, wherein the reflective-film-removal recording method causes the lands with the etched reflective film to be interpreted as values of '0' by a data reading information process apparatus and interpreted as values of '1' by a transfer device that physically copies discs.

12. The non-transitory recording medium according of claim 11, wherein the product mark includes:
(a) a serial number set for each information recording medium to be manufactured; and
(b) digital signature data set in correspondence to the serial number.

13. The non-transitory recording medium of claim 11, wherein the product mark includes:
(a) date-of-manufacturer information for an information recording medium to be manufactured; and
(b) digital signature data set in correspondence to the date-of-manufacturer information.

14. An information processing apparatus which executes data reading and content reproduction from an information recording medium recording encrypted content, the information processing apparatus comprising: a processor; and a memory device storing instructions which when executed by the processor, cause the processor to:
(a) execute reading of data from an information recording medium having a reflective film portion and a non-reflective film portion, wherein data is read from both the reflective film portion and the non-reflective film portion, the non-reflective film portion being created by a reflective-film-removal recording method that selectively etches a reflective film from lands that have been previously formed on the information recording medium, wherein the reflective-film-removal recording method causes the lands with the etched reflective film to be interpreted as values of '0' by a data reading information process apparatus and interpreted as values of '1' by a transfer device that physically copies discs;
(b) generate a key used for content decryption by executing data processing based on the read data;
(c) execute decryption of encrypted content based on the generated key;
(d) receive an input of key generating information; and
(e) generate a key used for content decryption by executing data processing to which the key generating information is applied, the key generating information including:
(i) a product mark including a public key certificate:
(A) corresponding to an information-recording-medium manufacturing entity or information-recording-medium manufacturing equipment; and
(B) containing identification information for an information-recording-medium manufacturing entity or information-recording-medium manufacturing equipment; and
(ii) an encrypted volume identifier as data obtained by performing encryption on a result of computation based on:
(A) a product-mark-associated value generated based on the product mark; and
(B) a volume identifier as an identifier set with respect to a given set of information recording media.

15. A method of operating an information processing apparatus which executes data reading and content reproduction from an information recording medium recording encrypted content, the method comprising:
(a) executing reading of data from an information recording medium having a reflective film portion and a non-reflective film portion, wherein data is read from both the reflective film portion and the non-reflective film portion, the non-reflective film portion being created by a reflective-film-removal recording method that selectively etches a reflective film from lands that have been previously formed on the information recording medium, wherein the reflective-film-removal recording method causes the lands with the etched reflective film to be interpreted as values of '0' by a data reading information process apparatus and interpreted as values of '1' by a transfer device that physically copies discs;
(b) generating a key used for content decryption by executing data processing based on the read data acquired by the data acquiring section;
(c) executing decryption of encrypted content based on the generated key; and
(d) inputting key generating information, and generating a key used for content decryption by executing data processing to which the key generating information is applied, the key generating information including:
(i) a product mark including a public key certificate:
(A) corresponding to an information-recording-medium manufacturing entity or information-recording-medium manufacturing equipment; and
(B) containing identification information for an information-recording-medium manufacturing entity or information-recording-medium manufacturing equipment; and
(ii) an encrypted volume identifier as data obtained by performing encryption on a result of computation based on:
(A) a product-mark-associated value generated based on the product mark; and
(B) a volume identifier as an identifier set with respect to a given set of information recording media.

16. A non-transitory computer readable storage medium storing a computer program for causing a computer to:
(a) execute reading of data from an information recording medium having a reflective film portion and a non-reflective film portion, wherein data is read from both the reflective film portion and the non-reflective film portion, the non-reflective film portion being created by a reflective-film-removal recording method that selectively etches a reflective film from lands that have been previously formed on the information recording medium, wherein the reflective-film-removal recording method causes the lands with the etched reflective film to be interpreted as values of '0' by a data reading information process apparatus and interpreted as values of '1' by a transfer device that physically copies discs;
(b) generate a key used for content decryption by executing data processing based on the read data;
(c) execute decryption of encrypted content based on the generated key;
(d) input key generating information; and
(e) generate a key used for content decryption by executing data processing to which the key generating information is applied, the key generating information including:
(i) a product mark including a public key certificate:
(A) corresponding to an information-recording-medium manufacturing entity or information-recording-medium manufacturing equipment; and
(B) containing identification information for an information-recording-medium manufacturing entity or information-recording-medium manufacturing equipment; and
(ii) an encrypted volume identifier as data obtained by performing encryption on a result of computation based on:
(A) a product-mark-associated value generated based on the product mark; and
(B) a volume identifier as an identifier set with respect to a given set of information recording media.

* * * * *